(12) United States Patent
Qian et al.

(10) Patent No.: US 8,727,044 B2
(45) Date of Patent: May 20, 2014

(54) POLYCRYSTALLINE DIAMOND COMPACT INCLUDING A CARBONATE-CATALYZED POLYCRYSTALLINE DIAMOND BODY AND APPLICATIONS THEREFOR

(75) Inventors: Jiang Qian, Cedar Hills, UT (US); Kenneth E. Bertagnolli, Riverton, UT (US); Jair J. Gonzalez, Provo, UT (US); Craig H. Cooley, Saratoga Springs, UT (US)

(73) Assignee: US Synthetic Corporation, Orem, UT (US)

( * ) Notice: Subject to any disclaimer, the term of this patent is extended or adjusted under 35 U.S.C. 154(b) by 442 days.

(21) Appl. No.: 13/070,636

(22) Filed: Mar. 24, 2011

(65) Prior Publication Data

US 2012/0241224 A1    Sep. 27, 2012

(51) Int. Cl.
    *E21B 10/36*    (2006.01)
(52) U.S. Cl.
    USPC ........ 175/433; 175/420.2; 175/434; 175/432; 175/428
(58) Field of Classification Search
    USPC ........... 175/405.1, 420.2, 434, 433, 432, 428; 76/108.2
    See application file for complete search history.

(56) References Cited

U.S. PATENT DOCUMENTS

| | | |
|---|---|---|
| 4,268,276 A | 5/1981 | Bovenkerk |
| 4,274,900 A | 6/1981 | Mueller et al. |
| 4,410,054 A | 10/1983 | Nagel et al. |
| 4,468,138 A | 8/1984 | Nagel |
| 4,560,014 A | 12/1985 | Geczy |
| 4,738,322 A | 4/1988 | Hall et al. |
| 4,811,801 A | 3/1989 | Salesky et al. |
| 4,913,247 A | 4/1990 | Jones |
| 5,016,718 A | 5/1991 | Tandberg |
| 5,092,687 A | 3/1992 | Hall |
| 5,120,327 A | 6/1992 | Dennis |
| 5,135,061 A | 8/1992 | Newton, Jr. |
| 5,154,245 A | 10/1992 | Waldenstrom et al. |
| 5,180,022 A | 1/1993 | Brady |

(Continued)

FOREIGN PATENT DOCUMENTS

| | | |
|---|---|---|
| JP | 4074766 | 3/1992 |
| WO | WO 2008/097284 | 8/2008 |
| WO | WO 2010/098978 | 9/2010 |

OTHER PUBLICATIONS

International Search Report and Written Opinion from International Application No. PCT/US2012/028051 mailed Aug. 6, 2012.

(Continued)

*Primary Examiner* — Cathleen Hutchins
(74) *Attorney, Agent, or Firm* — Dorsey & Whitney LLP

(57) ABSTRACT

In an embodiment, a polycrystalline diamond compact ("PDC") includes a substrate and a pre-sintered polycrystalline diamond ("PCD") table bonded to the substrate. The pre-sintered PCD table includes an upper surface, a back surface bonded to the substrate, and at least one lateral surface extending between the upper surface and the back surface. The pre-sintered PCD table includes a region including at least a residual amount of at least one interstitial constituent disposed in at least a portion of the interstitial regions thereof, and a bonding region. The at least one interstitial constituent includes at least one metal carbonate and/or at least one metal oxide. The region extends inwardly from the upper surface and the at least one lateral surface.

28 Claims, 12 Drawing Sheets

(56) References Cited

U.S. PATENT DOCUMENTS

| | | |
|---|---|---|
| 5,333,699 A * | 8/1994 | Thigpen et al. ............... 175/431 |
| 5,364,192 A | 11/1994 | Damm et al. |
| 5,368,398 A | 11/1994 | Damm et al. |
| 5,460,233 A | 10/1995 | Meany et al. |
| 5,480,233 A | 1/1996 | Cunningham |
| 5,544,713 A | 8/1996 | Dennis |
| 5,624,756 A | 4/1997 | Ueda et al. |
| 5,912,217 A | 6/1999 | Sumiya et al. |
| 6,248,447 B1 | 6/2001 | Griffin et al. |
| 6,793,681 B1 | 9/2004 | Pope et al. |
| 6,878,447 B2 | 4/2005 | Griffin et al. |
| 7,261,753 B2 | 8/2007 | Yamamoto et al. |
| 7,845,438 B1 | 12/2010 | Vail et al. |
| 2007/0187154 A1 | 8/2007 | Yamamoto et al. |
| 2007/0187155 A1 | 8/2007 | Middlemiss |
| 2009/0152015 A1 | 6/2009 | Sani et al. |
| 2010/0108403 A1 * | 5/2010 | Keshavan ..................... 175/428 |

OTHER PUBLICATIONS

U.S. Appl. No. 11/545,929, filed Oct. 10, 2006, Bertagnolli et al.

* cited by examiner

POLYCRYSTALLINE DIAMOND COMPACT INCLUDING A CARBONATE-CATALYZED POLYCRYSTALLINE DIAMOND BODY AND APPLICATIONS THEREFOR

BACKGROUND

Wear-resistant, polycrystalline diamond compacts ("PDCs") are utilized in a variety of mechanical applications. For example, PDCs are used in drilling tools (e.g., cutting elements, gage trimmers, etc.), machining equipment, bearing apparatuses, wire-drawing machinery, and in other mechanical apparatuses.

PDCs have found particular utility as superabrasive cutting elements in rotary drill bits, such as roller-cone drill bits and fixed-cutter drill bits. A PDC cutting element typically includes a superabrasive diamond layer commonly known as a diamond table. The diamond table is formed and bonded to a substrate using a high-pressure/high-temperature ("HPHT") process. The PDC cutting element may also be brazed directly into a preformed pocket, socket, or other receptacle formed in a bit body. The substrate may often be brazed or otherwise joined to an attachment member, such as a cylindrical backing. A rotary drill bit typically includes a number of PDC cutting elements affixed to the bit body. It is also known that a stud carrying the PDC may be used as a PDC cutting element when mounted to a bit body of a rotary drill bit by press-fitting, brazing, or otherwise securing the stud into a receptacle formed in the bit body.

Conventional PDCs are normally fabricated by placing a cemented carbide substrate into a container or cartridge with a volume of diamond particles positioned on a surface of the cemented carbide substrate. A number of such cartridges may be loaded into an HPHT press. The substrate(s) and volume of diamond particles are then processed under HPHT conditions in the presence of a catalyst material that causes the diamond particles to bond to one another to form a matrix of bonded diamond grains defining a polycrystalline diamond ("PCD") table. The catalyst material is often a metal-solvent catalyst (e.g., cobalt, nickel, iron, or alloys thereof) that is used for promoting intergrowth of the diamond particles.

In one conventional approach, a constituent of the cemented carbide substrate, such as cobalt from a cobalt-cemented tungsten carbide substrate, liquefies and sweeps from a region adjacent to the volume of diamond particles into interstitial regions between the diamond particles during the HPHT process. The cobalt acts as a metal-solvent catalyst to promote intergrowth between the diamond particles, which results in the formation of a matrix of bonded diamond grains having diamond-to-diamond bonding therebetween, with interstitial regions between the bonded diamond grains being occupied by the metal-solvent catalyst.

The presence of the metal-solvent catalyst in the PCD table is believed to reduce the thermal stability of the PCD table at elevated temperatures. For example, chipping or cracking of the PCD table during drilling or cutting operations is believed to be due to the presence of the metal-solvent catalyst, which consequently can degrade the mechanical properties of the PCD table or cause failure. Additionally, some of the diamond grains can undergo a chemical breakdown or back-conversion to graphite via interaction with the solvent catalyst. At elevated high temperatures, portions of diamond grains may transform to carbon monoxide, carbon dioxide, graphite, or combinations thereof, causing degradation of the mechanical properties of the PCD table.

Despite the availability of a number of different PDCs, manufacturers and users of PDCs continue to seek PDCs that exhibit improved toughness, wear resistance, and thermal stability.

SUMMARY

Embodiments of the invention relate to PDCs including a PCD body sintered using at least one carbonate catalyst material, substrateless PCD cutting elements sintered using at least one carbonate catalyst material, and methods of fabricating such PDCs. In an embodiment, a PDC includes a substrate and a pre-sintered PCD table bonded to the substrate. The pre-sintered PCD table includes bonded diamond grains defining a plurality of interstitial regions. The pre-sintered PCD table further includes an upper surface, a back surface bonded to the substrate, and at least one lateral surface extending between the upper surface and the back surface. The pre-sintered PCD table additionally includes a region including at least a residual amount of at least one interstitial constituent disposed in at least a portion of the interstitial regions thereof, and a bonding region adjacent to the substrate. The at least one interstitial constituent includes at least one metal carbonate and/or at least one metal oxide. The region extends inwardly from the upper surface and the at least one lateral surface. The bonding region includes a metallic infiltrant and a residual amount of the at least one interstitial constituent disposed in at least a portion of the interstitial regions thereof.

In an embodiment, a rotary drill bit includes a bit body configured to engage a subterranean formation and a plurality of PDC cutting elements affixed to the bit body. At least one of the PCD cutting elements includes a PDC as described in the immediately preceding paragraph.

In an embodiment, a method of manufacturing a PDC includes assembling a treated PCD table with a substrate. The treated PCD table includes an upper surface, a back surface, and at least one lateral surface extending between the upper surface and the back surface. The treated PCD table further includes a region including a residual amount of at least one interstitial constituent disposed in at least a portion of the interstitial regions thereof. The at least one interstitial constituent includes at least one metal carbonate and/or at least one metal oxide. The region extends inwardly from at least the back surface of the treated PCD table. The method further includes bonding the region of the treated polycrystalline diamond table to the substrate.

In an embodiment, a PCD cutting element includes bonded diamond grains defining a plurality of interstitial regions. The PCD cutting element further includes an upper surface, a back surface, and at least one lateral surface extending between the upper surface and the back surface. The PCD cutting element additionally includes a region having a residual amount of at least one interstitial constituent disposed in at least a portion of the interstitial regions thereof. The at least one interstitial constituent includes at least one metal carbonate and/or at least one metal oxide. The region extends inwardly from at least the back surface and the at least one lateral surface.

In an embodiment, a rotary drill bit includes a bit body configured to engage a subterranean formation and a plurality of PCD cutting elements affixed to the bit body. At least one of the PCD cutting elements, configured as the PCD cutting element as described in the immediately preceding paragraph, may be directly bonded to the bit body without a substrate intervening between the bit body and the PCD cutting element.

In an embodiment, a method of manufacturing a rotary drill bit includes disposing a PCD cutting element, as described hereinabove, in a corresponding cutter recess of a bit body of the rotary drill bit. The method further includes bonding the PCD cutting element directly to the bit body.

Other embodiments include applications utilizing the disclosed PDCs in various articles and apparatuses, such as bearing apparatuses, wire-drawing dies, machining equipment, and other articles and apparatuses.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the invention, wherein identical reference numerals refer to identical elements or features in different views or embodiments shown in the drawings.

DETAILED DESCRIPTION

Embodiments of the invention relate to PDCs including a PCD body sintered using at least one carbonate catalyst material, substrateless PCD cutting elements sintered using at least one carbonate catalyst material, and methods of fabricating such PDCs and PCD cutting elements. The PDCs and PCD cutting elements disclosed herein may be used in a variety of applications, such as rotary drill bits, bearing apparatuses, wire-drawing dies, machining equipment, and other articles and apparatuses.

Figure 1A:
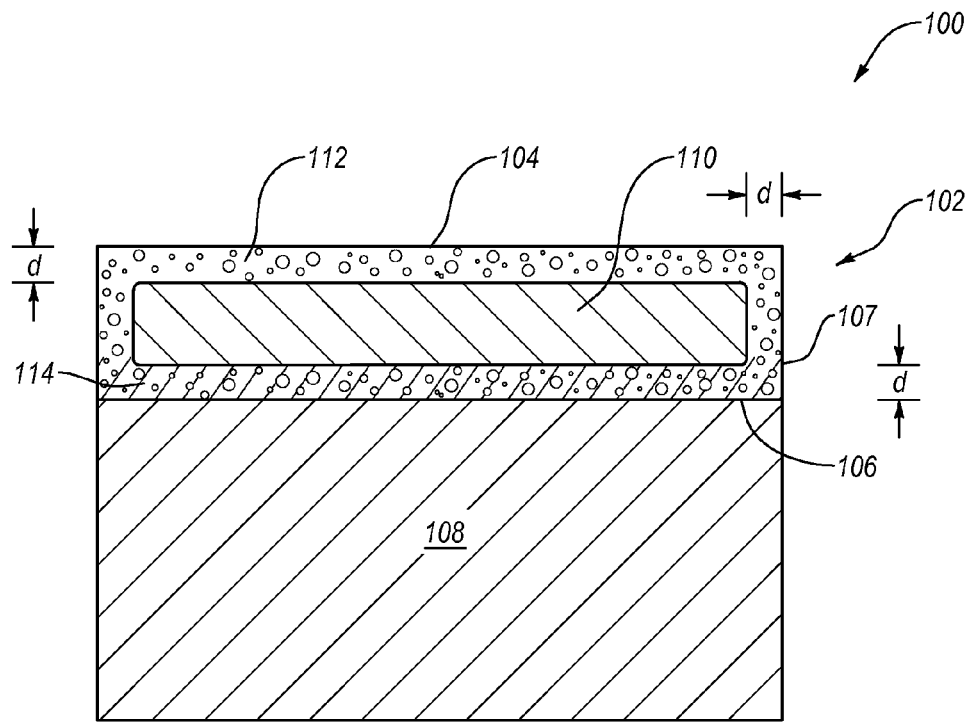
FIG. 1A is a cross-sectional view of an embodiment of a PDC.

FIG. 1A is a cross-sectional view of an embodiment of a PDC 100 including a pre-sintered PCD table 102 that was sintered using at least one carbonate catalyst material. The PCD table 102 includes a working upper surface 104, a generally opposing interfacial back surface 106, and at least one lateral surface 107 extending therebetween. It is noted that at least a portion of the at least one lateral surface 107 may also function as a working surface that contacts a subterranean formation during drilling.

The back surface 106 of the PCD table 102 is bonded to a substrate 108. The substrate 108 may include, without limitation, cemented carbides, such as tungsten carbide, titanium carbide, chromium carbide, niobium carbide, tantalum carbide, vanadium carbide, or combinations thereof cemented with iron, nickel, cobalt, or alloys thereof. In an embodiment, the substrate 108 comprises cobalt-cemented tungsten carbide. Although the back surface 106 of the PCD table 102 is depicted in FIG. 1A as being substantially planar, in other embodiments, the back surface 106 may exhibit a selected nonplanar topography and the substrate 108 may exhibit a correspondingly configured interfacial surface or other selected interfacial surface.

The PCD table 102 includes a plurality of directly bonded-together diamond grains having diamond-to-diamond bonding (e.g., $sp^3$ bonding) therebetween. The plurality of bonded diamond grains define a plurality of interstitial regions. The PCD table 102 includes a core region 110 partially or substantially completely surrounded by a depletion region 112 and a bonding region 114. The core region 110 includes at least one interstitial constituent disposed in at least a portion of the interstitial regions thereof. The at least one interstitial constituent includes at least one metal carbonate and/or at least one metal oxide formed by conversion of the at least one metal carbonate after formation of the PCD table 102 and/or as a sintering by-product formed during sintering of diamond particles to form the diamond-to-diamond bonding between the diamond grains of the PCD table 102.

The at least one interstitial constituent, including the at least one metal carbonate and/or at least one metal oxide, may be present in the core region 110 of the PCD table 102 in an amount of about 0.1 weight % to about 20 weight %, about 0.5 weight % to about 10 weight %, about 1 weight % to about 5 weight %, or about 1.5 weight % to about 3 weight % of the PCD table 102. The at least one metal carbonate present in the PCD table 102 may be selected from one or more alkali metal carbonates (e.g., one or more carbonates of Li, Na, and K), one or more alkaline earth metal carbonates (e.g., one or more carbonates of Be, Mg, Ca, Sr, and Ba), and any combination of the foregoing carbonates. The at least one metal oxide present in the PCD table 102 may be selected from one or more alkali metal oxides (e.g., one or more oxides of Li, Na, and K), one or more alkaline earth metal oxides (e.g., one or more carbonates of Be, Mg, Ca, Sr, and Ba), and any combination of the foregoing oxides.

In the illustrated embodiment, the depletion region 112 of the PCD table 102 extends about at least part of the core region 110, and along at least part of the at least one lateral surface 107 and further along the upper surface 104. The depth "d" to which the depletion region 112 extends inwardly from the upper surface 104 and/or the at least one lateral surface 107 may be about 50 μm to about 1000 μm, about 200 μm to about 500 μm, about 300 μm to about 450 μm, about 500 μm to about 700 μm, or about 700 μm to about 1000 μm.

The depletion region 112 may be substantially free of the at least one interstitial constituent. As described in more detail below, the depletion region 112 may be formed by leaching. For example, the depletion region 112 may include a residual amount of the at least one interstitial constituent and/or one or more leaching by-products disposed in at least a portion of the interstitial regions thereof due to the depletion region 112 being formed by leaching and at least partially removing the at least one interstitial constituent therefrom. For example, the at least one interstitial constituent may be present in the depletion region 112 of the PCD table 102 in a residual amount of about 0.05 weight % to about 1.50 weight %, about 0.8 weight % to about 1.50 weight %, or about 0.9 weight % to about 1.2 weight % of the PCD table 102. The one or more leaching by-products may include one or more chlorides of Be, Mg, Ca, Sr, Ba, Li, Na, and K; one or more fluorides of Be, Mg, Ca, Sr, Ba, Li, Na, and K; or any combination of the foregoing salts.

The bonding region 114 may be disposed between the core region 110 and the substrate 108, and extends along at least the back surface 106. At least a portion of the interstitial regions of the bonding region 114 may include a metallic infiltrant disposed therein that is infiltrated and provided from the substrate 108 along with a residual amount of the at least one interstitial constituent present in the same amount as in the depletion region 112. For example, the metallic infiltrant may comprise iron, nickel, cobalt, or alloys thereof. As a further example, when the substrate 108 is a cobalt-cemented tungsten carbide substrate, the metallic infiltrant may comprise cobalt that infiltrates into the bonding region 114 of the PCD table 102 during bonding of the PCD table 102 to the substrate 108 in an HPHT process. The bonding region 114 extends inwardly from the back surface 106 to a selected depth "D," which may be about the same as the depth "d."

In some embodiments, the bonding region 114 may extend along part of the at least one lateral surface 107 depending upon the extent to which the metallic infiltrant infiltrates. Further, in the illustrated embodiment, there is no intervening portion of the depletion region 112 disposed between the bonding region 114 and the core region 110. However, in other embodiments, a portion of the depletion region 112 may remain and may be disposed between the bonding region 114 and the core region 110.

Figure 1B:
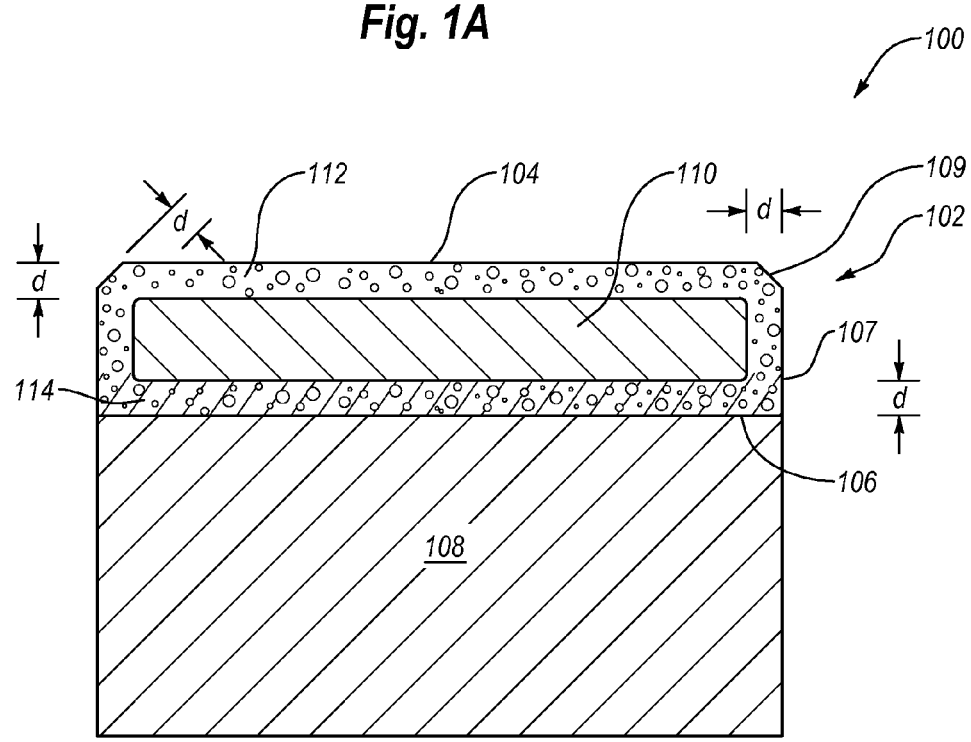
FIG. 1B is a cross-sectional view of the PDC shown in FIG. 1A, with the pre-sintered PCD table including a chamfer.
Figure 1C:
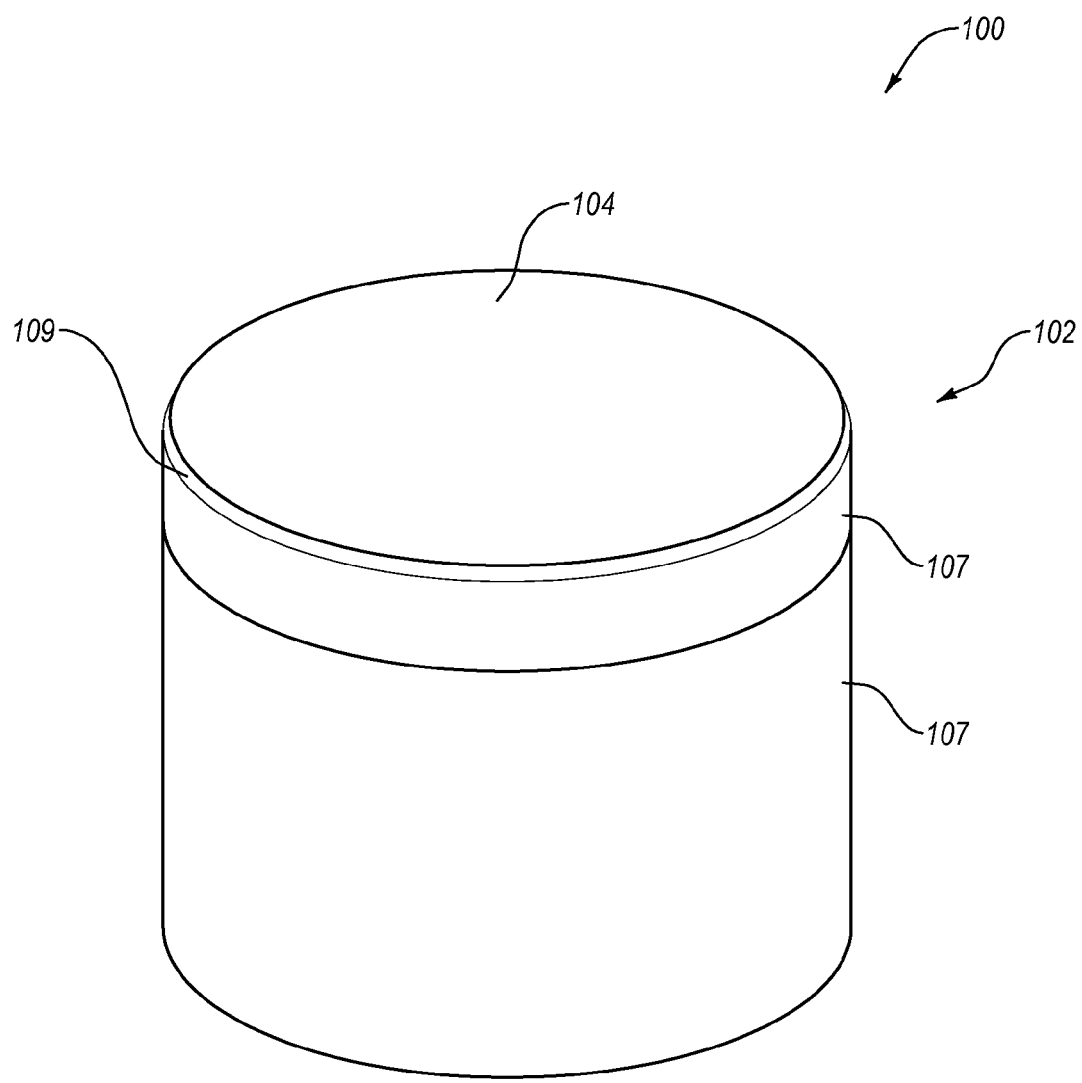
FIG. 1C is an isometric view the PDC shown in FIG. 1B.

FIGS. 1B and 1C are cross-sectional and isometric views, respectively, of the PDC 100 when the pre-sintered PCD table 102 includes a chamfer 109 formed therein according to an embodiment. The chamfer 109 extends between the upper surface 104 and the at least one lateral surface 107. In the illustrated embodiment, the depletion region 112 contours the chamfer 109 and the upper surface 104 so that a depth "d" to which the depletion region 112 extends inwardly is about the same as measured from the chamber 109 and the upper surface 104. This occurs when the pre-sintered PCD table 102 is chamfered prior to leaching to form the depletion region 112. When the pre-sintered PCD table 102 is chamfered after leaching, the depletion region 112 may not contour the chamfer 109 so that the depth "d" to which the depletion region 112 extends inwardly from the chamfer 109 is less than the depth "d" that the depletion region 112 extends inwardly from the upper surface 104.

Figure 1D:
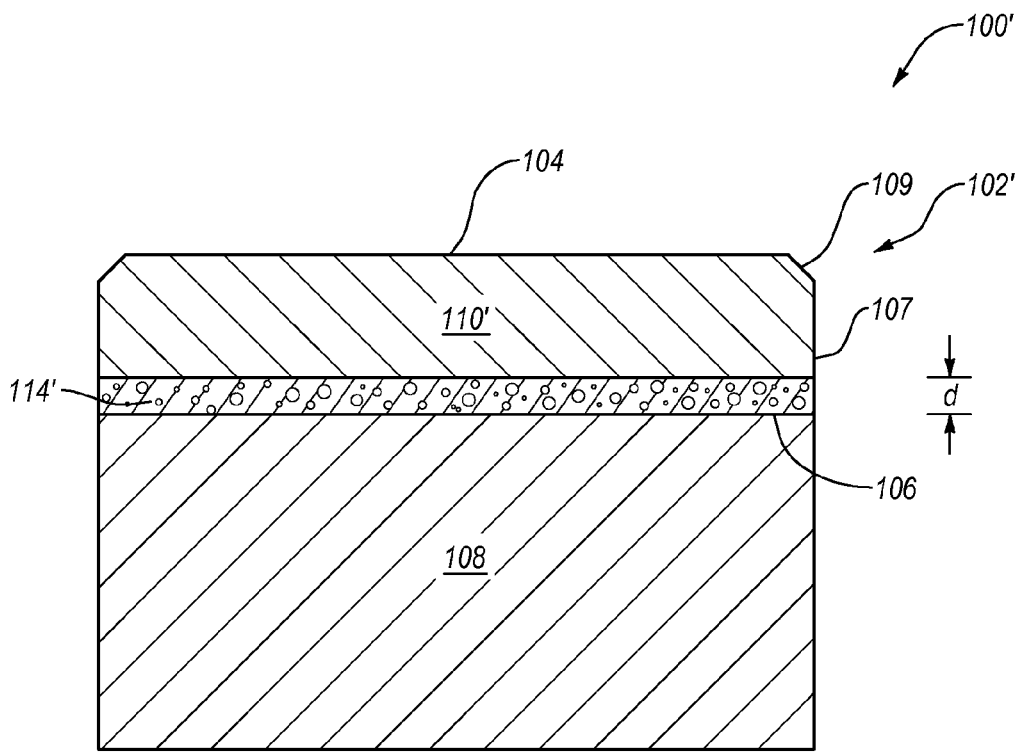
FIG. 1D is a cross-sectional view of another embodiment of a PDC including a PCD table that has only been depleted of at least one interstitial constituent adjacent to a back surface thereof.

FIG. 1D is a cross-sectional view of another embodiment of a PDC 100' including a PCD table 102' that has only been depleted of the at least one interstitial constituent adjacent to the back surface 106. As shown in FIG. 1D, the PCD table 102' includes a bonding region 114' including a metallic infiltrant disposed therein that is infiltrated from the substrate 108 or other source and a residual amount of the at least one interstitial constituent (present in any of the disclosed residual amounts). The PCD table 102' also includes a region 110' that has not been depleted of the at least one interstitial constituent. The bonding region 114' extends inwardly from the back surface 106 to a selected depth "D" and may extend laterally to the at least one lateral surface 107. For example, the depth "D" to which the bonding region 114' extends inwardly from the back surface 106 may be about 50 μm to about 1000 μm, about 200 μm to about 500 μm, about 300 μm to about 450 μm, about 500 μm to about 700 μm, or about 700 μm to about 1000 μm. The region 110' extends inwardly from the upper surface 104, the chamfer 109, and the at least one lateral surface 107. Depending upon the size of the depletion region that was formed prior to infiltration to form the bonding region 114', the region 110' may comprise most of the PCD table 102'. Further, in the illustrated embodiment, there is no intervening portion of the depletion region disposed between the bonding region 114' and the region 110'. However, in other embodiments, a portion of the depletion region may remain and may be disposed between the bonding region 114' and the region 110'.

Figure 1E:
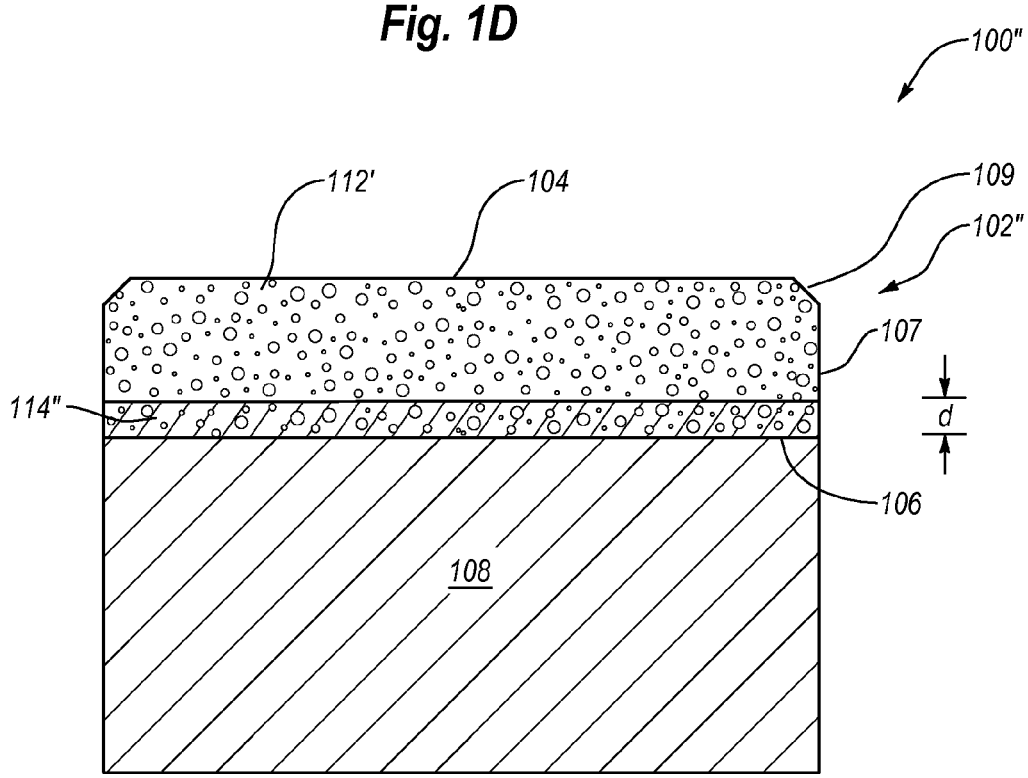
FIG. 1E is a cross-sectional view of another embodiment of a PDC including a PCD table has been depleted of at least one interstitial constituent substantially therethrough.

FIG. 1E is a cross-sectional view of another embodiment of a PDC 100" including a PCD table 102" that has been depleted of the at least one interstitial constituent substantially therethrough. As shown in FIG. 1E, the PCD table 102" includes a bonding region 114" including a metallic infiltrant disposed therein that is infiltrated from the substrate 108 or other source, and a depletion region 112' that has been depleted of the at least one interstitial constituent prior to attachment to the substrate 108. For example, the at least one interstitial constituent may be present in the depletion region 112' and the bonding region 114" in any of the residual amounts previously disclosed herein. The bonding region 114" extends inwardly from the back surface 106 to a selected depth "D" and may extend laterally to the at least one lateral surface 107. For example, the depth "D" to which the bonding region 114" extends inwardly from the back surface 106 may be about 50 μm to about 1000 μm, about 200 μm to about 500 μm, about 300 μm to about 450 μm, about 500 μm to about 700 μm, or about 700 μm to about 1000 μm. The depletion region 112' extends inwardly from the upper surface 104, the chamfer 109, and the at least one lateral surface 107.

Figure 1F:
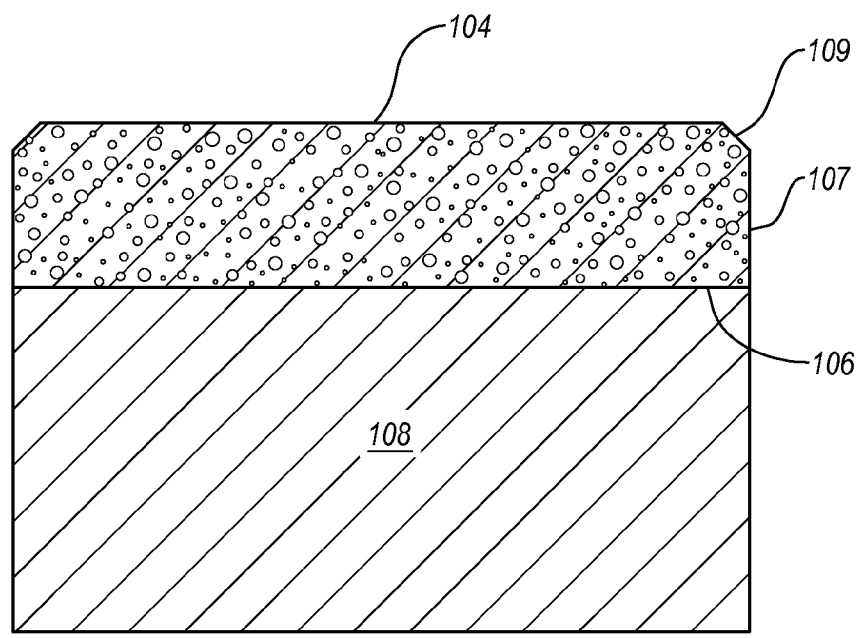
FIG. 1F is a cross-sectional view of another embodiment of a PDC including a PCD table that is infiltrated with a metallic infiltrant all the way to an upper surface thereof.
Figure 1G:
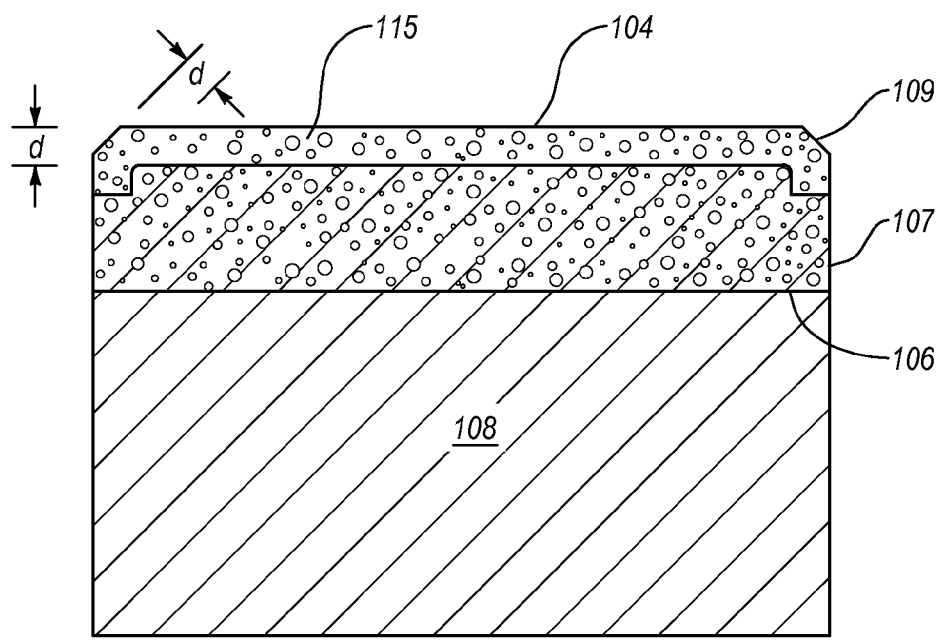
FIG. 1G is a cross-sectional view of another embodiment of a PDC formed by at least partially leaching the PCD table shown in FIG. 1F of the metallic infiltrant to a selected depth.

In the illustrated embodiment shown in FIG. 1E, the depletion region 112' may comprise most of the PCD table 102". However, as shown in FIG. 1F, in other embodiments, the metallic infiltrant may infiltrate all the way to the upper surface 104 of the PCD table 102". Referring to FIG. 1G, in yet a further embodiment, after infiltration, the metallic infiltrant may be acid leached to a selected depth "d" measured from the upper surface 104 and/or the chamfer 109 to form a leached region 115 that is depleted of the metallic infiltrant. For example, the leached region 115 may generally contour the upper surface 104, the chamfer 109, and the at least one lateral surface 107. The leached region 115 may extend along a selected length of the at least one lateral surface 107. A residual amount of the metallic infiltrant may be present in the leached region 115 even after leaching. For example, the metallic infiltrant may comprise about 0.8 weight % to about 1.50 weight % and, more particularly, about 0.9 weight % to about 1.2 weight % of the PCD table.

Figure 2:
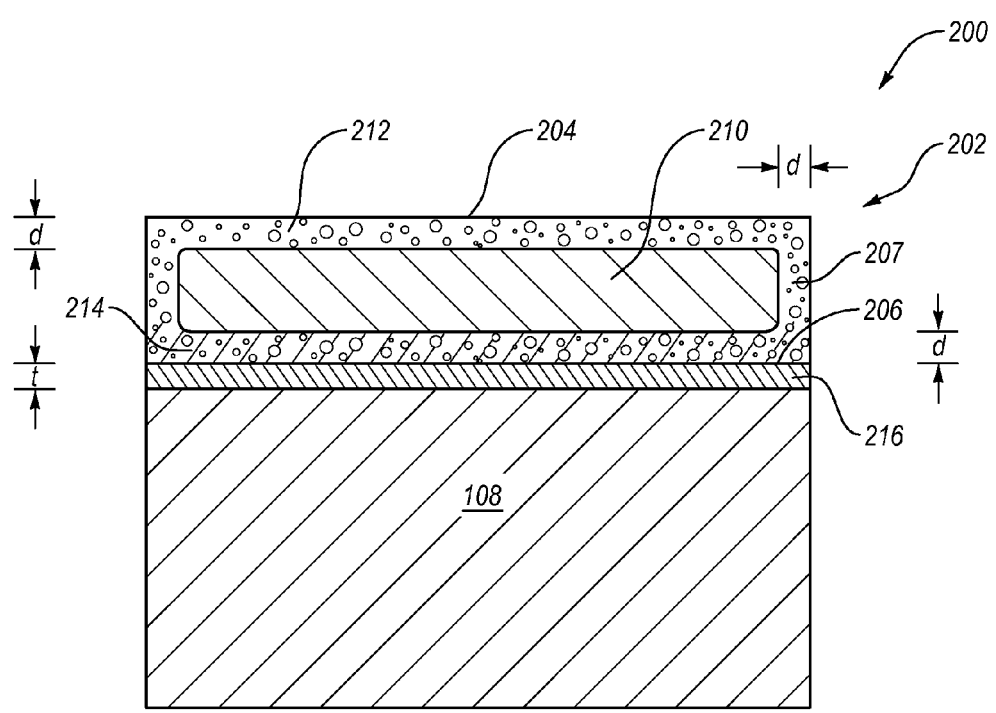
FIG. 2 is a cross-sectional view of an embodiment of a PDC including a pre-sintered PCD table brazed to a substrate.

FIG. 2 is a cross-sectional view of an embodiment of a PDC 200 in which a pre-sintered PCD table 202 is brazed to the substrate 108. The PCD table 202 includes an upper surface 204, a back surface 206, and at least one lateral surface 207 extending therebetween. The PCD table 202 further includes a core region 210 partially or substantially completely surrounded by a depletion region 212 and a bonding region 214. The core region 210 includes the at least one interstitial constituent disposed in at least a portion of the interstitial regions thereof in any of the foregoing amounts.

The depletion region 212 of the PCD table 202 extends about at least part of the core region 210, and along at least part of the at least one lateral surface 207 and further along the upper surface 204. The depth "d" to which the depletion region 212 extends inwardly from the upper surface 204 and/or the at least one lateral surface 207 may be a selected depth. For example, the depth "d" may be about 50 µm to about 1000 µm, about 200 µm to about 500 µm, about 300 µm to about 450 µm, about 500 µm to about 700 µm, or about 700 µm to about 1000 µm.

The depletion region 212 may include a residual amount of the at least one interstitial constituent and/or the one or more leaching by-products disposed in at least a portion of the interstitial regions thereof due to the depletion region 212 being formed by leaching and at least partially removing the at least one interstitial constituent therefrom. For example, the at least one interstitial constituent may be present in the depletion region 212 of the PCD table 202 in a residual amount of about 0.05 weight % to about 1.50 weight %, about 0.8 weight % to about 1.50 weight %, or about 0.9 weight % to about 1.2 weight % of the PCD table 202.

The bonding region 214 may be disposed between the core region 210 and the back surface 206, and may extend along at least part of the back surface 206. A braze alloy layer 216 is disposed between the back surface 206 and the substrate 108. At least a portion of the interstitial regions of the bonding region 214 may include braze alloy disposed therein that has been infiltrated and provided from the braze alloy layer 216. In some embodiments, a thickness "t" of the braze alloy layer 216 may be tailored to at least improve (e.g., maximize) joint strength between the substrate 108 and the PCD table 202. For example, the thickness "t" may be about 0.0010 inch to about 0.050 inch, such as about 0.0050 inch to about 0.050 inch or about 0.010 inch to about 0.040 inch. Depending upon the extent of infiltration of the braze alloy, the braze alloy layer 216 may not be present because substantially all of the material thereof may have infiltrated into the PCD table 202 and is present in the bonding region 214. Additionally, depending on the extent of infiltration into the PCD table 202, the bonding region 214 may also extend along part of the at least one lateral surface 207.

Suitable braze alloys for the braze alloy layer 216 include gold, silver, copper, or titanium alloys. For example, suitable braze alloys for the braze alloy layer 216 may include gold-tantalum alloys or silver-copper-titanium alloys. In one specific embodiment, a braze alloy for the braze alloy layer 216 may comprise an alloy of about 4.5 weight % titanium, about 26.7 weight % copper, and about 68.8 weight % silver, otherwise known as TICUSIL®, which is currently commercially available from Wesgo Metals, Hayward, Calif. In a further embodiment, a braze alloy for the braze alloy layer 216 may comprise an alloy of about 25 weight % gold, about 37 weight % copper, about 10 weight % nickel, about 15 weight % palladium, and about 13 weight % manganese, otherwise known as PALNICUROM® 10, which is also currently commercially available from Wesgo Metals, Hayward, Calif. Another suitable braze alloy may include about 92.3 weight % nickel, about 3.2 weight % boron, and about 4.5 weight % silicon. Yet another suitable braze alloy may include about 92.8 weight % nickel, about 1.6 weight % boron, and about 5.6 weight % silicon.

In other embodiments, the PCD table may have been depleted of the at least one interstitial constituent immediately adjacent to the back surface 206 similar to the embodiment shown in FIG. 1D and brazed to the substrate 108. In such an embodiment, the braze alloy of the braze alloy layer 216 may at least partially infiltrate into the depletion region. In other embodiments, the PCD table may have been depleted of the at least one interstitial constituent substantially therethrough similar to the embodiment shown in FIG. 1E and brazed to the substrate 108. In such an embodiment, the braze alloy of the braze alloy layer 216 may infiltrate into the PCD table to only a shallow selected depth or may infiltrate more fully such as to or near the upper surface 204.

Although the PDCs 100 and 200 shown in FIGS. 1A-2 are illustrated as being cylindrical, the PDCs disclosed herein may exhibit other selected configurations. For example, the PDCs may exhibit a rectangular, triangular, elliptical, or other selected configuration.

Figure 3A:
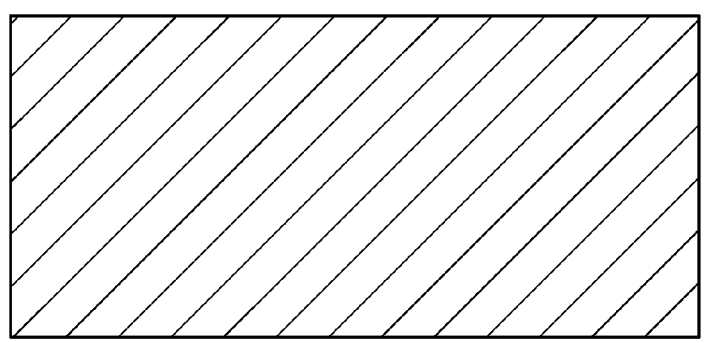
FIGS. 3A-3C are cross-sectional views at different stages during a method of manufacturing the PDC shown in FIG. 1A according to an embodiment.
Figure 3B:
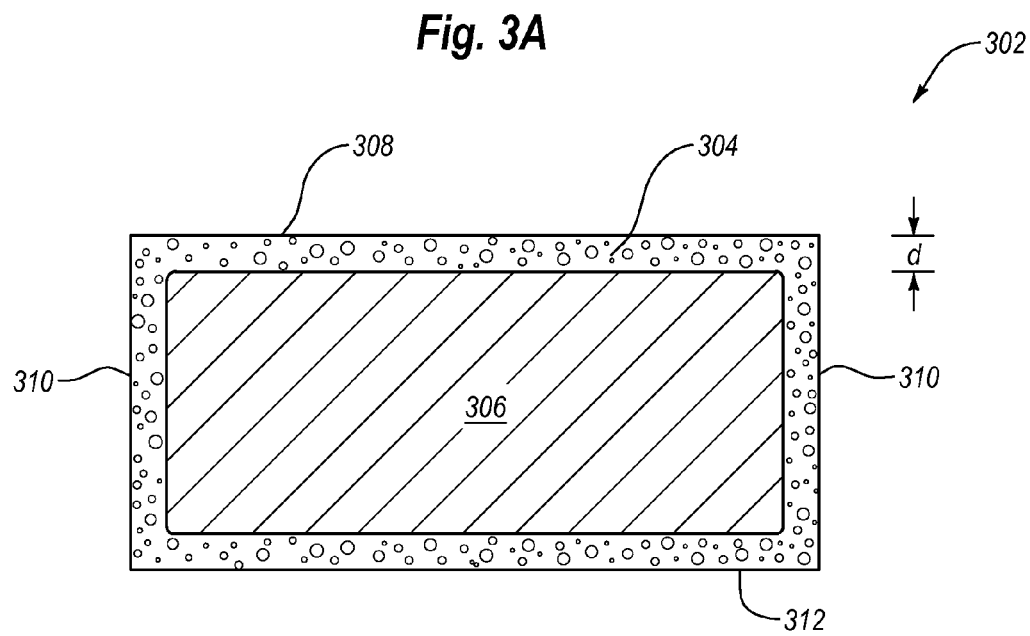
Figure 3C:
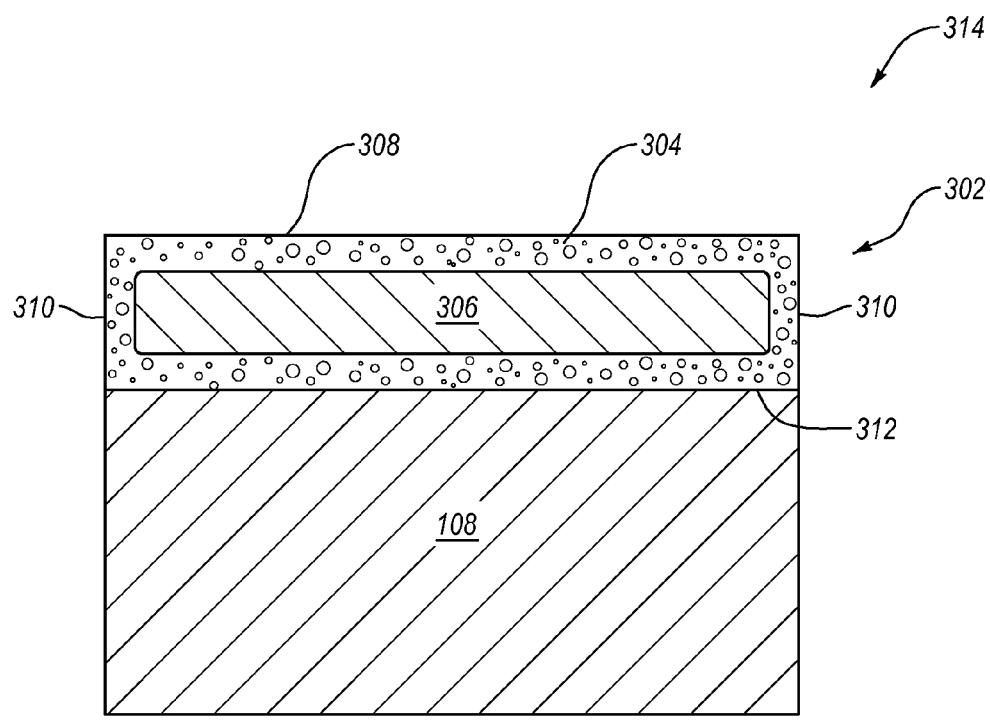

FIGS. 3A-3C are cross-sectional views at different stages during a method of manufacturing the PDC 100 shown in FIG. 1A according to an embodiment. Referring to FIG. 3A, a PCD body/table 300 is provided that has been fabricated by sintering diamond particles in the presence of at least one carbonate catalyst material. The PCD body/table 300 is fabricated by mixing a plurality of diamond particles and at least one carbonate catalyst material that catalyzes the growth of additional diamond between the diamond particles during HPHT processing.

The diamond particles may exhibit one or more selected sizes. However, a representative average particle size for the diamond particles is about 0.5 µm to about 25 µm, with the diamond particles exhibiting a single modal or at least a bi-modal particle size distribution. For example, the one or more selected sizes may be determined, for example, by passing the diamond particles through one or more sizing sieves or by any other method. In an embodiment, the plurality of diamond particles may include a relatively larger size and at least one relatively smaller size. As used herein, the phrases "relatively larger" and "relatively smaller" refer to particle sizes determined by any suitable method, which differ by at least a factor of two (e.g., 40 µm and 20 µm). More particularly, in various embodiments, the plurality of diamond particles may include a portion exhibiting a relatively larger size (e.g., 100 µm, 90 µm, 80 µm, 70 µm, 60 µm, 50 µm, 40 µm, 30 µm, 20 µm, 15 µm, 12 µm, 10 µm, 8 µm) and another portion exhibiting at least one relatively smaller size (e.g., 30 µm, 20 µm, 10 µm, 15 µm, 12 µm, 10 µm, 8 µm, 4 µm, 2 µm, 1 µm, 0.5 µm, less than 0.5 µm, 0.1 µm, less than 0.1 µm). In an embodiment, the plurality of diamond particles may include a portion exhibiting a relatively larger size between about 40 µm and about 15 µm and another portion exhibiting a relatively smaller size between about 12 µm and 2 µm. The plurality of diamond particles may also include three or more different sizes (e.g., one relatively larger size and two or more relatively smaller sizes) without limitation.

The at least one carbonate catalyst material may include one or more alkali metal carbonates (e.g., one or more carbonates of Li, Na, and K), one or more alkaline earth metal carbonates (e.g., one or more carbonates of Be, Mg, Ca, Sr, and Ba), or any combination of the foregoing carbonates. For example, the at least one carbonate catalyst material may be in the form of a fine powder. According to one embodiment, at least one carbonate catalyst material may include a first alkali metal carbonate and at least a second alkali metal carbonate present in selected proportions at or near a eutectic composition for the chemical system defined by the first and at least a second alkali metal carbonates. In an embodiment, the first alkali metal carbonate may be selected from a Group I carbonate (e.g., a carbonate of Li, Na, K, Rb, or Cs) and the at least a second alkali metal carbonate may be selected from one or more Group I carbonates that are different than that of the first alkali metal carbonate. For example, the first alkali metal carbonate and the at least a second alkali metal carbonate may form a binary or greater chemical system that exhibits a eutectic point, and the first alkali metal carbonate and the at least a second alkali metal carbonate may form a eutectic, hypereutectic, or hypoeutectic composition.

According to an embodiment, the at least one carbonate catalyst material may comprise lithium carbonate, sodium carbonate, and potassium carbonate. In an embodiment, the lithium carbonate, sodium carbonate, and potassium carbonate may be present in selected proportions at or near a ternary eutectic composition (e.g., a eutectic composition, a hypereutectic composition, or a hypoeutectic composition) for the lithium carbonate-sodium carbonate-potassium carbonate chemical system. In the lithium carbonate-sodium carbonate-potassium carbonate chemical system, the ternary eutectic composition occurs when the lithium carbonate is present in an amount of about 43.5 atomic percent, the sodium carbonate is present in an amount of about 31.5 atomic percent, and the potassium carbonate is present in an amount about 25 atomic percent and the ternary eutectic temperature is about 397° C. at approximately 1 atmosphere and about 1100° C. to about 1300° C. at approximately 7.7 GPa.

The diamond particles and the at least one carbonate catalyst material may be mixed to form a mixture by any suitable mixing process, such as a milling process. For example, the mixture may be formed by mixing the diamond particles and the at least one carbonate material in an attritor mill, a ball mill, or by another suitable mixing technique. The at least one carbonate catalyst material may be present in the mixture in an amount of about 0.1 weight % to about 20 weight %, about 0.5 weight % to about 10 weight %, about 1 weight % to about 5 weight %, or about 1.5 weight % to about 3 weight %, with the balance of the mixture being essentially the diamond particles. However, the balance may also include small amounts of $sp^2$-carbon-containing particles (e.g., graphite particles, fullerenes, ultra-dispersed diamond particles, or combinations thereof), which may provide $sp^2$-carbon to help promote diamond growth during HPHT processing. For example, the $sp^2$-carbon-containing particles may be present in the mixture in an amount of about 1 weight % to about 10 weight %, such as about 2.5 weight % to about 5 weight %.

The mixture may be subjected to an HPHT process to partially or completely melt the at least one carbonate catalyst material and sinter the diamond particles to form the PCD body/table 300 shown in FIG. 3A. In order to efficiently HPHT process the mixture, the mixture may be placed in a pressure transmitting medium, such as a refractory metal can, salt, graphite structure, pyrophyllite, combinations of the foregoing, or other pressure transmitting structure. For example, additives may be mixed with the salt, such as graphite, lampblack, iron oxide, magnesium oxide, zirconium oxide, aluminum oxide, or combinations of the foregoing to help with thermal management. The salt and/or at least one additive may have a particle size (e.g., diameter) of about 0.0015 inch to about 0.0203 inch, such as about 0.0110 inch to about 0.0203 inch, about 0.0083 inch to about 0.0110 inch, or about 0.0055 inch to about 0.0083 inch. One method for forming relatively small particle sizes of the salt and the at least one additive may be to spray dry a solution of salt with the at least one additive incorporated in the solution. In some embodiments, the mixture may be sealed in a can assembly. For example, U.S. application Ser. No. 11/545,929, which is incorporated herein in its entirety by this reference, discloses various embodiments for sealing the mixture in a canister.

The pressure transmitting medium, including the mixture, may be subjected to an HPHT process using an ultra-high pressure press (e.g., a cubic or belt press) at a temperature sufficient to partially or completely melt the at least one carbonate catalyst material and at a corresponding pressure so that the diamond phase is thermodynamically stable. The HPHT process is performed for a time sufficient to partially or completely melt the at least one carbonate catalyst material and sinter the diamond particles to form the PCD body/table 300. Generally, the temperature may be at least sufficient to melt the at least one carbonate catalyst material, such as a temperature of at least about 800° C. and a pressure of at least about 5 GPa. For example, the temperature may be about 800° C. to about 2400° C. and a pressure of about 3.5 GPa to about 10 GPa (e.g., about 1100° C. to about 1300° C. and a pressure of about 7 GPa to about 8 GPa). The pressure values disclosed herein refer to the pressure in the pressure transmitting medium also known as the cell pressure.

According to an embodiment, employing the at least one carbonate catalyst material including at least one alkali metal carbonate enables forming PCD at temperature and pressure conditions comparable to temperature and pressure conditions used to form PCD using cobalt or other metal-solvent catalysts to promote diamond growth and using conventional ultra-high pressure presses, such as a temperature below about 2250° C. and a pressure below about 8 GPa. For example, the temperature of the HPHT process may be selected to be at or near a eutectic temperature of the at least one carbonate catalyst material. However, as desired or needed, in other embodiments, the temperature may be above about 1700° C. (e.g., about 1800° C. to about 2400° C.) and the pressure may be above about 7.5 GPa (e.g., about 8 GPa to about 10 GPa). Pressures above about 7.5 GPa may be accomplished by selectively dimensioning the contact area of the anvil faces of the anvils of an HPHT cubic press that applies the pressure to the pressure transmitting medium.

After HPHT processing, the PCD body/table 300 includes a plurality of directly bonded-together diamond grains, with at least a portion of the interstitial regions between the bonded-together diamond grains occupied by the at least one interstitial constituent previously discussed with respect to FIG. 1A. For example, as previously discussed, the at least one interstitial constituent may include at least one metal carbonate and/or at least one metal oxide.

In another embodiment, the at least one carbonate catalyst material may be provided in a disk or layer form that is not mixed with the diamond particles. In such an embodiment, the at least one carbonate catalyst material may infiltrate into the diamond particles to catalyze PCD formation during HPHT processing.

Referring to FIG. 3B, the PCD body/table 300 may be subjected to a material removal process to remove at least a portion of the at least one interstitial constituent from a peripheral region of the PCD body/table 300 to form a treated PCD body 302 including a depletion region 304 from which the at least one interstitial constituent is depleted relative to a core region 306 that is relatively unaffected by the material removal process.

Prior to or after the material removal process, the PCD body/table 300 may be shaped, such as by machining or grinding, to selectively tailor the geometry of the PCD body/table 300. For example, a chamfer (not shown) may be machined that extends between two major surfaces of the PCD body/table 300.

In an embodiment, the material removal may be performed in a leaching process. For example, the PCD body/table 300 may be immersed in an acid (e.g., hydrochloric acid, nitric acid, hydrofluoric acid, or mixtures thereof) for a time sufficient to form the depletion region 304. For example, the leaching may be performed for a time ranging from a few hours to a few days. In some embodiments, the depletion region 304 may be substantially free of the at least one interstitial constituent. Residual amounts of one or more leaching by-products generated during the removal of the at least one interstitial constituent during the leaching process may still remain in at least some of the interstitial regions of the depletion region 304. For example, the one or more leaching by-products may include salts, such as one or more chlorides of Be, Mg, Ca, Sr, Ba, Li, Na, and K; one or more fluorides of Be, Mg, Ca, Sr, Ba, Li, Na, and K; or any combination of the foregoing salts. The specific type of the one or more salts that may be present in the depletion region 304 depends upon the composition of the at least one carbonate catalyst material and the acid used to leach the PCD body/table 300. However, the presence of the residual one or more leaching by-products is not sufficient to significantly inhibit infiltration of the depletion region 304. In some embodiments, the treated PCD body/table 302 may be cleaned to at least partially remove leaching by-products from the depletion region 304. For example, U.S. Pat. No. 7,845,438, which is incorporated herein in its entirety by this reference, discloses various cleaning techniques for at least partially remove leaching by-products from the depletion region 304 of the treated PCD body/table 302.

The depletion region 304 extends inwardly from an upper surface 308, at least one lateral surface 310, and a back surface 312 of the treated PCD body/table 302. For example, the depth "d" to which the depletion region 304 extends may be 50 μm to about 1000 μm, about 200 μm to about 500 μm, about 300 μm to about 450 μm, about 500 μm to about 700 μm, or about 700 μm to about 1000 μm. The depth "d" may be approximately the same measured from the upper surface 308, the at least one lateral surface 310, and the back surface 312.

Referring to FIG. 3C, the treated PCD body/table 302 may be placed adjacent to the substrate 108 to form an assembly 314. The assembly 314 may be subjected to an HPHT process using any of the HPHT conditions and pressure transmitting mediums disclosed herein. In some embodiments, the assembly 314 may be sealed in a can assembly as disclosed in U.S. application Ser. No. 11/545,929, previously incorporated by reference. During the HPHT process, a metallic cementing constituent from the substrate 108 liquefies and infiltrates as a metallic infiltrant into at least a portion of the interstitial regions of the depletion region 306 adjacent to the back surface 312 of the treated PCD body 302. For example, when the substrate 108 is a cobalt-cemented tungsten carbide substrate, the metallic infiltrant may be cobalt provided from a cobalt-cemented tungsten carbide substrate. Upon cooling from the HPHT process, the metallic infiltrant provides a strong metallurgical bond between the infiltrated PCD body (i.e., PCD table 102 shown in FIG. 1A) and the substrate 108.

Depending upon the extent of the infiltration of the metallic infiltrant, the metallic infiltrant may even infiltrate into a portion of the depletion region 302 adjacent to the at least one lateral surface 310.

During the HPHT processing, some or substantially all of the metal carbonate present in the treated PCD body 302 may convert to a corresponding metal oxide. For example, if the metal carbonate was magnesium carbonate, some of the magnesium carbonate may convert to magnesium oxide during the HPHT process. However, in other embodiments, the treated PCD body 302 may be heat treated to convert some or substantially all of the at least one metal carbonate present in the treated PCD body 302 to a corresponding at least one metal oxide prior to and/or after the HPHT process in which the treated PCD body 302 is bonded to the substrate 108. For example, the treated PCD body 302 may be heated to a temperature of about 450° C. to about 700° C. (e.g., 600° C.) for a time sufficient to convert the at least one metal carbonate to a corresponding at least one metal oxide.

Figure 3D:
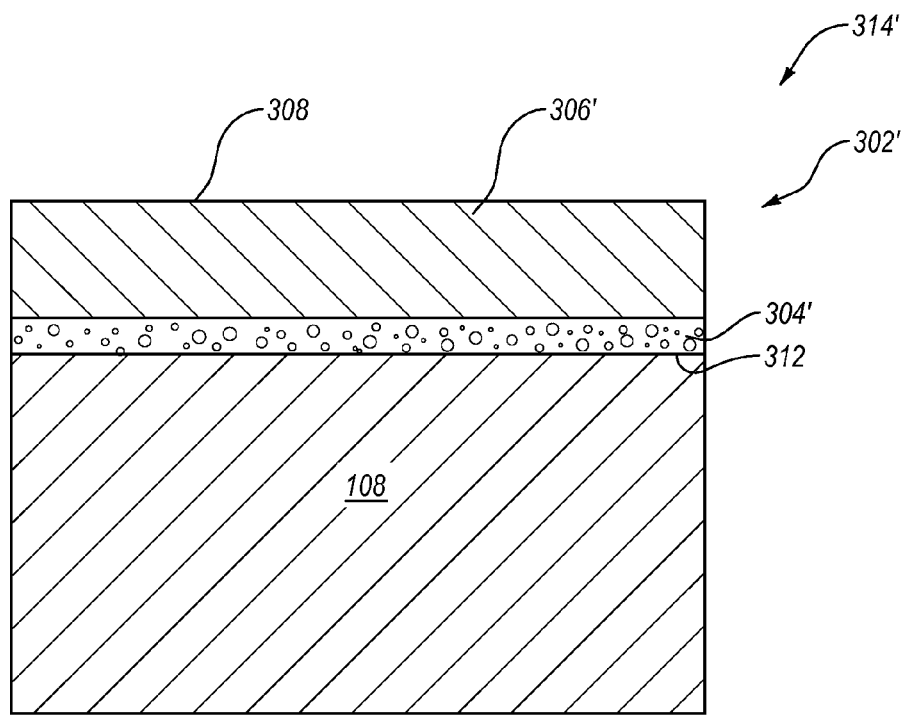
FIG. 3D is a cross-sectional view of an in-process assembly to be HPHT processed to form the PDC shown in FIG. 1D according to another embodiment.

Referring to FIG. 3D, in other embodiments, an assembly 314' may be formed by placing PCD table 302' having a depletion region 304' adjacent to the substrate 108 and a region 306' that is not depleted of the at least one interstitial constituent away from the substrate 108. The assembly 314' may be HPHT processed to form a PDC similar or the same as the PDC 100' shown in FIG. 1D.

Figure 3E:
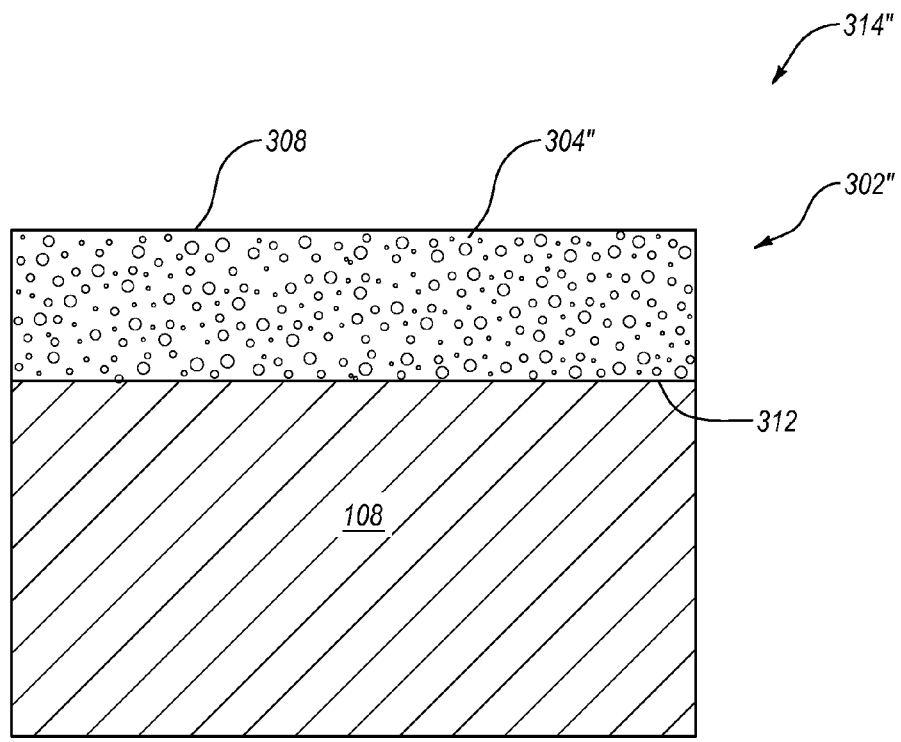
FIG. 3E is a cross-sectional view of an in-process assembly to be HPHT processed to form the PDC shown in FIG. 1E or 1F according to another embodiment.

Referring to FIG. 3E, in other embodiments, an assembly 314" may be formed by placing PCD table 302" that has been depleted of the at least one interstitial constituent substantially therethrough (identified as 304") adjacent to the substrate 108. The assembly 314" may be HPHT processed to form a PDC similar or the same as the PDC shown in FIG. 1E or 1F. If the PCD table 302" is fully infiltrated with a metallic infiltrant, the metallic infiltrant may be removed by acid leaching to form a PDC similar to or the same as the PDC shown in FIG. 1G.

It is noted that in other embodiments, a selected upper region of the treated PCD body/table 302 remote from the substrate 108 may be infiltrated with at least one low-carbon-solubility material. The at least one low-carbon-solubility material may be chosen from a number of different metals, alloys, and semiconductors, such as copper, tin, indium, gadolinium, germanium, gold, silver, aluminum, lead, zinc, cadmium, bismuth, antimony, combinations thereof, and alloys thereof. Techniques for selectively infiltrating the treated PCD body/table 302 are disclosed in U.S. Application No. 13/027,954, which is incorporated herein, in its entirety, by this reference.

Figure 3F:
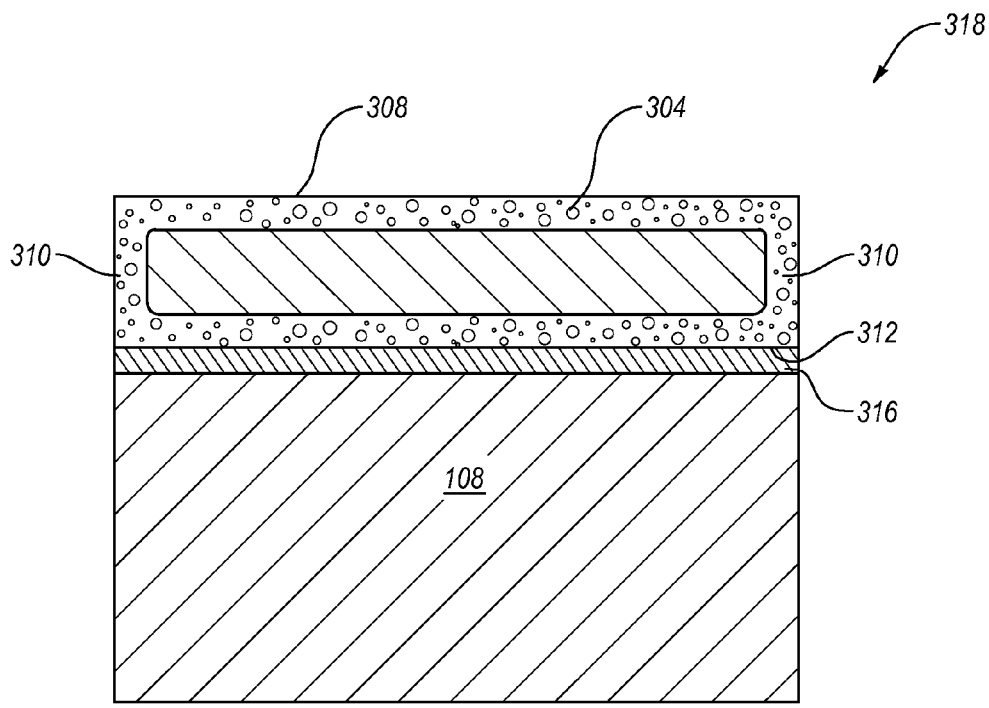
FIG. 3F is cross-sectional view at a stage during a method of manufacturing the PDC shown in FIG. 2 according to another embodiment.

Referring to FIG. 3F, when the treated PCD body/table 302 is to be brazed to the substrate 108 to form the PDC 200 shown in FIG. 2, at least one layer of braze alloy 316 may be placed between the treated PCD body/table 302 and the substrate 108 to form an assembly 318. In some embodiments, one or more spacers may be disposed between the back surface 312 of the treated PCD body/table 302 and the substrate 108 to help control joint thickness. The at least one layer of braze alloy 316 may be formed from any of the braze alloy compositions disclosed herein in powder and/or foil form. The assembly 318 may be subjected to a suitable braze temperature cycle that melts and causes the braze alloy of the at least one layer of braze alloy 316 to reflow so that so that a strong metallurgical bond is formed between the substrate 108 and the treated PCD body/table 302 upon cooling. For example, the braze temperature cycle may be performed by heating the assembly 318 in a furnace (e.g., a vacuum furnace or induction furnace), or another suitable heating method. The brazing temperature depends, at least in part, on the liquidus temperature of the braze alloy of the at least one layer of braze alloy 316. For example, typically, the brazing temperature may be about 800° C. to about 1300° C.

During the brazing process, at least some of the braze alloy infiltrates into at least a portion of the interstitial regions of the depletion region 304 adjacent to the back surface 312. Depending upon the extent of infiltration of the braze alloy from the at least one layer of braze alloy 316, a layer of braze alloy disposed between the substrate 108 and the infiltrated PCD table may not be present because substantially all of the braze alloy may have infiltrated into the treated PCD body/table 302 and is present in a bonding region (e.g., bonding region 214 in FIG. 2). In some embodiments, when the braze alloy is an active braze alloy, the braze alloy may react with diamond grains of the treated PCD body/table 302 to form one or more carbides. Additionally, depending on the extent of infiltration into the treated PCD body/table 302, the bonding region may extend along part of the at least one lateral surface 310.

Figure 4:
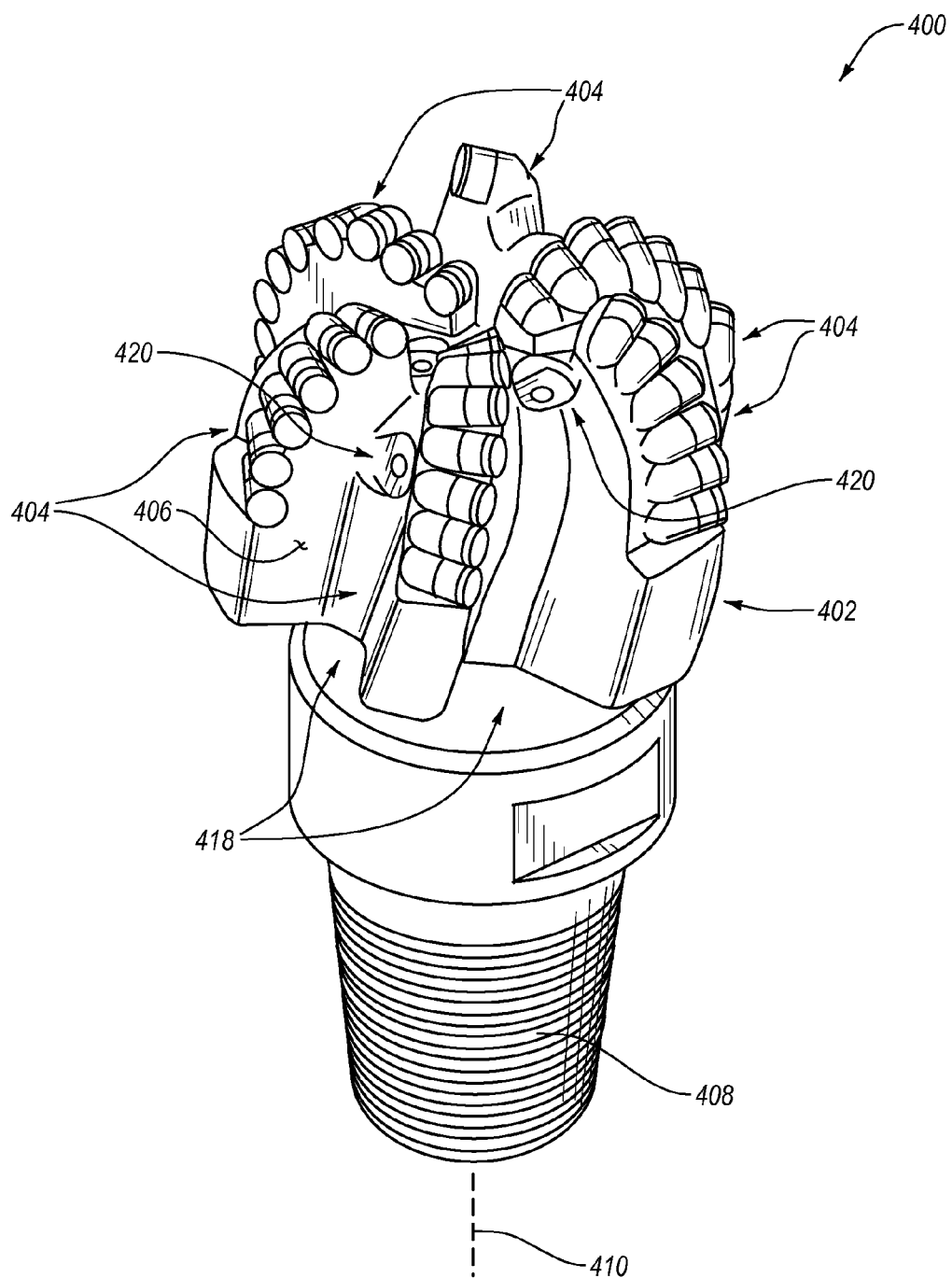
FIG. 4 is an isometric view of an embodiment of a rotary drill bit that may employ one or more of the disclosed PDC embodiments.
Figure 5:
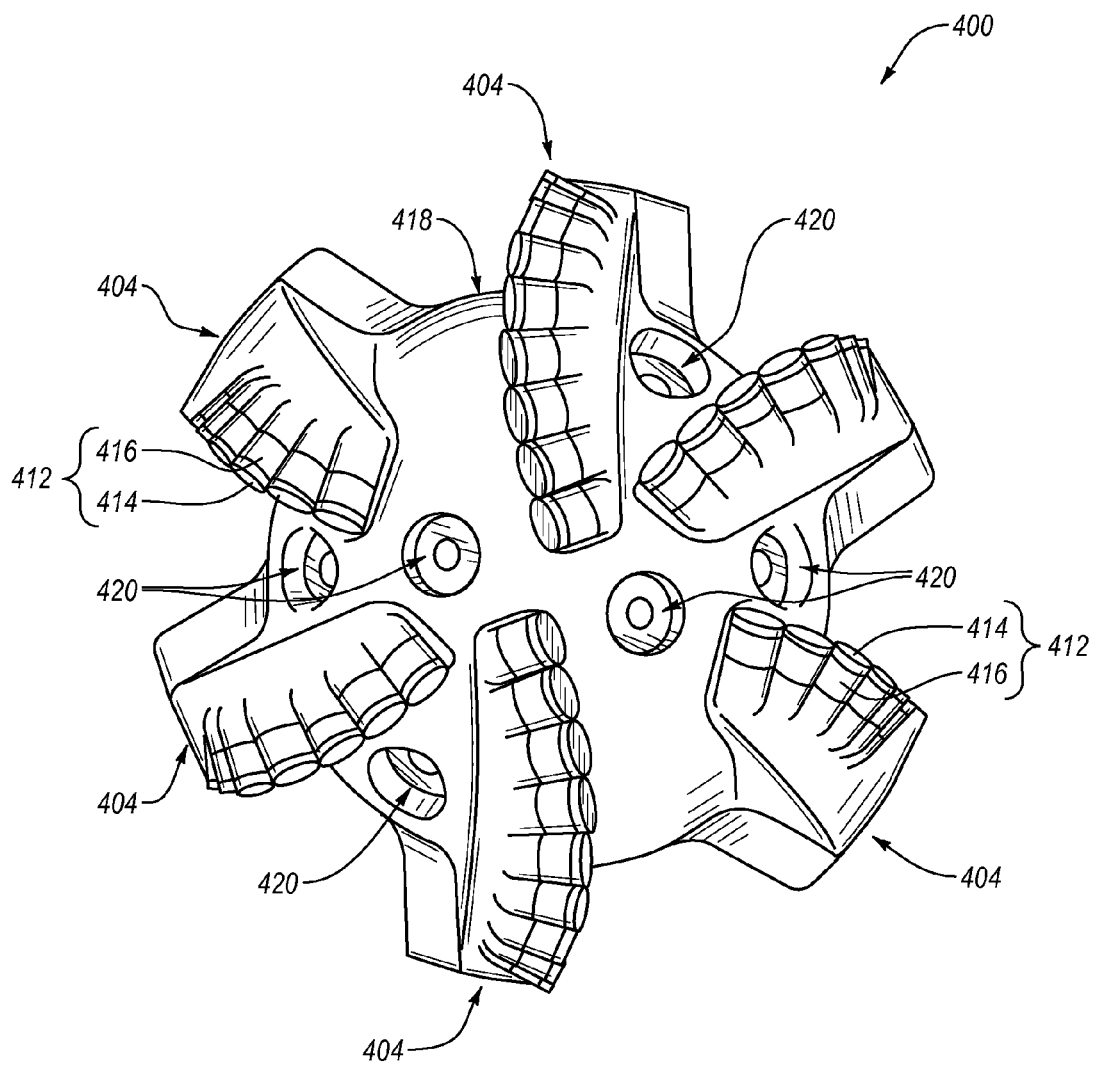
FIG. 5 is a top elevation view of the rotary drill bit shown in FIG. 4.

FIG. 4 is an isometric view and FIG. 5 is a top elevation view of an embodiment of a rotary drill bit 400 that includes at least one PDC configured according to any of the disclosed PDC embodiments. The rotary drill bit 400 comprises a bit body 402 that includes radially and longitudinally extending blades 404 having leading faces 406, and a threaded pin connection 408 for connecting the bit body 402 to a drilling string. The bit body 402 defines a leading end structure for drilling into a subterranean formation by rotation about a longitudinal axis 410 and application of weight-on-bit. At least one PDC, configured according to any of the previously described PDC embodiments, may be affixed to the bit body 402. With reference to FIG. 5, each of a plurality of PDCs 412 is secured to the blades 404 of the bit body 402 (FIG. 4). For example, each PDC 412 may include a PCD table 414 bonded to a substrate 416. More generally, the PDCs 412 may comprise any PDC disclosed herein, without limitation. In addition, if desired, in some embodiments, a number of the PDCs 412 may be conventional in construction. Also, circumferentially adjacent blades 404 define so-called junk slots 418 therebetween. Additionally, the rotary drill bit 400 includes a plurality of nozzle cavities 420 for communicating drilling fluid from the interior of the rotary drill bit 400 to the PDCs 412.

FIGS. 4 and 5 merely depict one embodiment of a rotary drill bit that employs at least one PDC fabricated and structured in accordance with the disclosed embodiments, without limitation. The rotary drill bit 400 is used to represent any number of earth-boring tools or drilling tools, including, for example, core bits, roller-cone bits, fixed-cutter bits, eccentric bits, bicenter bits, reamers, reamer wings, or any other downhole tool including superabrasive compacts, without limitation.

Figure 6:
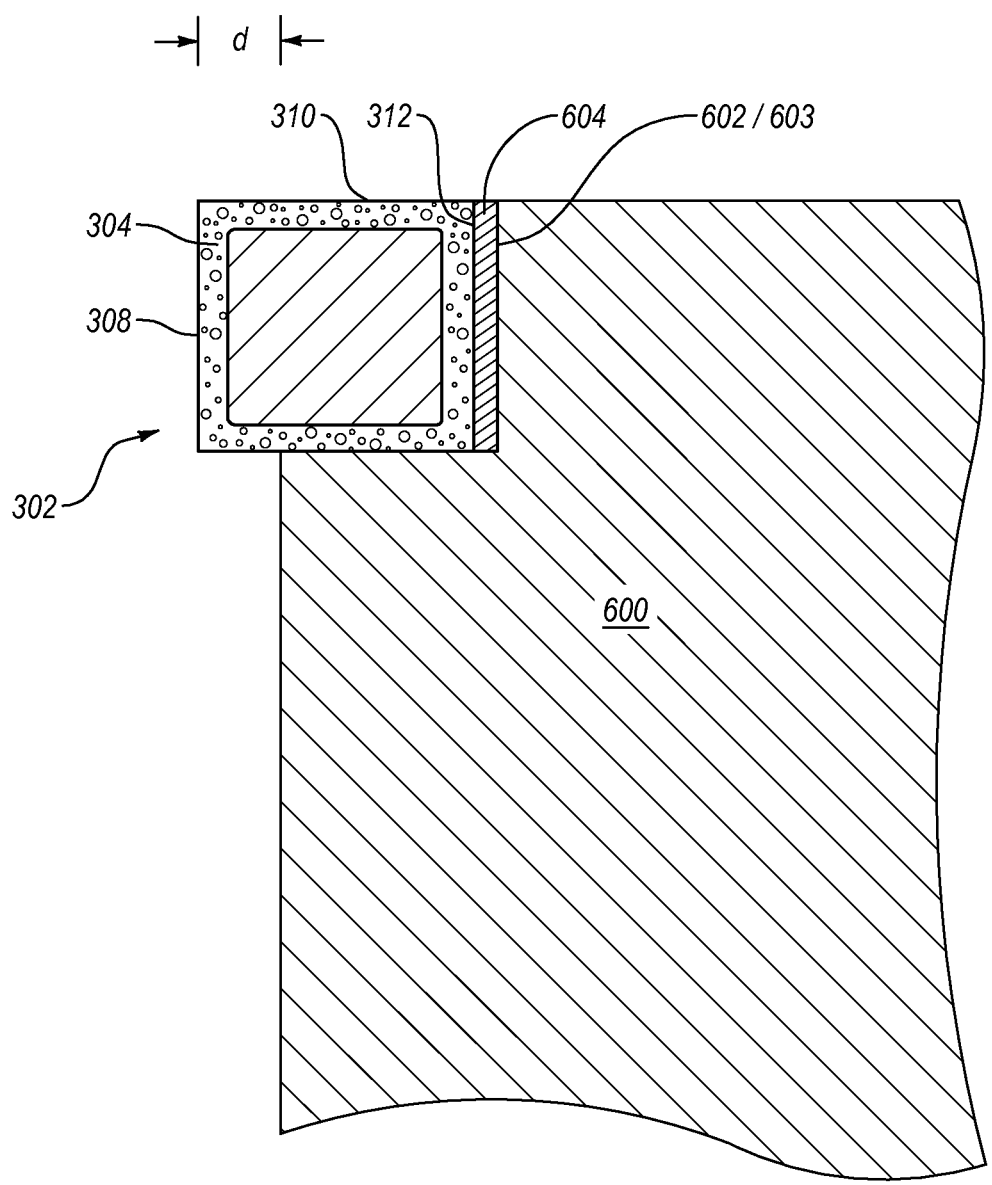
FIG. 6 is a cross-sectional view of a bit body similar to the bit body shown in FIG. 5, with the treated PCD body/table shown in FIG. 3B positioned in a recess prior to being brazed to the bit body.

Referring to FIG. 6, in other embodiments, the treated PCD body/table 302/302'/302" may be employed as a PCD cutting element without having to use a substrate. The treated PCD body/table 302 is illustrated in FIG. 6 as merely an example. For example, the treated PCD body/table 302/302'/302" may be directly brazed to a bit body 600 of a rotary drill bit without an intervening substrate being disposed between the treated PCD body/table 302/302'/302" and the bit body 600. The substrate may be a weak link in a PDC cutting element because it may be more susceptible to erosion and/or corrosion than the PCD table to which it is bonded. Therefore, omitting the substrate may help eliminate one possible failure mode in a PDC cutting element.

The treated PCD body/table 302/302'/302" may be selectively shaped, as desired or needed, prior to brazing to the bit body 600. For example, a chamfer may be machined in the treated PCD body/table 302/302'/302" prior to leaching and/or brazing to the bit body 600. In practice, the treated PCD body/table 302/302'/302" may be inserted into a corresponding recess 602 formed in the bit body 600 with at least one layer of braze alloy 604 disposed between a base 603 of the recess 602 and the back surface 312 of the treated PCD body/table 302/302'/302". The treated PCD body/table 302/302'/302" and the recess 602 are dimensioned relative to each other so that the treated PCD body/table 302/302'/302" projects a suitable distance "d" from the bit body 600. The at least one layer of braze alloy 604 may be formed from any of the braze alloy compositions disclosed herein in powder and/or foil form.

The in-process rotary drill bit assembly shown in FIG. 6 may be subjected to a suitable braze temperature cycle that melts and causes the braze alloy of the at least one layer of braze alloy 604 to reflow so that a strong metallurgical bond is formed between the treated PCD body/table 302/302'/302" and the bit body 600 upon cooling. For example, the braze temperature cycle may be performed by heating the in-process rotary drill bit assembly in a furnace, with a handheld brazing torch, or another suitable heating method. The brazing temperature depends, at least in part, on the liquidus temperature of the braze alloy. For example, typically, the brazing temperature may be about 600° C. to about 1300° C.

During the brazing process, at least a portion of the interstitial regions of the depletion region 304 adjacent to the back surface 312 of the treated PCD body/table 302/302'/302" may be infiltrated and filled with braze alloy from the at least one layer of braze alloy 604 to form a bonding region. Depending on the extent of infiltration into the treated PCD body/table 302/302'/302", the bonding region may extend along part of the at least one lateral surface 310 as well as the back surface 312.

In other embodiments, the bit body 600 may be formed from an infiltrated carbide material. For example, the bit body 600 may be formed from a plurality of carbide particles, such as tungsten carbide particles, cemented together with a copper or copper alloy binder. In practice, the treated PCD body/table 302/302'/302" may be inserted into a corresponding recess 602 formed in a precursor to the bit body 600 in a green state. The precursor of the bit body 600 in the green state may be formed from the carbide particles held together with an organic binder. The precursor of the bit body 600 in the green state with the treated PCD body/table 302/302'/302" may be infiltrated with the molten binder made, for example, from a copper or copper alloy. During the infiltration process, the binder also infiltrates into at least a portion of the interstitial regions of the depletion region 304 adjacent to the back surface 312 of the treated PCD body/table 302/302'/302" to form a bonding region. Depending on the extent of infiltration into the treated PCD body/table 302/302'/302", the bonding region may also extend along part of the at least one lateral surface 310 as well as the back surface 312. As the molten binder cools and solidifies, it bonds the carbide particles of the bit body 600 together and the bonding region of the infiltrated treated PCD body/table to the infiltrated bit body 600.

In other embodiments, a treated PCD body/table may be formed by catalyzing diamond growth using a metal-solvent catalyst (e.g., cobalt, iron, nickel, or alloys thereof) in an HPHT process using any of the disclosed diamond particle sizes/distributions and HPHT process conditions. The metal-solvent catalyst may be provided in particulate form and mixed with the diamond particles, infiltrated into the diamond particles form a thin disc of metal-solvent catalyst, provided from a cemented carbide substrate (e.g., cobalt from a cobalt-cemented tungsten carbide substrate), or combinations of the foregoing. After sintering the diamond particles to form a PCD body/table, the PCD body/table may be shaped (if desired or needed) and subjected to a leaching process to form a treated PCD body/table structured similarly to the treated PCD body/table 302. However, in such an embodiment, a core region may include the metal-solvent catalyst as the at least one interstitial constituent as opposed to the at least one metal carbonate and/or the at least one metal oxide. Additionally, a depletion region may include a residual amount of the metal-solvent catalyst that is not removed during the leaching process to form a depletion region. For example, the residual amount of the metal-solvent catalyst may be about 0.8 weight % to about 1.50 weight % and, more particularly, about 0.9 weight % to about 1.2 weight % of the treated PCD body/table. Such metal-solvent-catalyst-catalyzed treated PCD body/tables may be bonded to a bit body of rotary drill bit by brazing or by infiltration of the bit body as described above with respect to bonding the treated PCD body/table 302 to a bit body.

The PDCs disclosed herein (e.g., PDCs 100 of FIG. 1A) may also be utilized in applications other than cutting technology. For example, the disclosed PDC embodiments may be used in wire dies, bearings (e.g., thrust and radial bearing assemblies), artificial joints, inserts, cutting elements, and heat sinks. Thus, any of the PDCs disclosed herein may be employed in an article of manufacture including at least one superabrasive element or compact.

Thus, the embodiments of PDCs disclosed herein may be used in any apparatus or structure in which at least one conventional PDC is typically used. In one embodiment, a rotor and a stator, assembled to form a thrust-bearing apparatus, may each include one or more PDCs (e.g., PDC 100 of FIG. 1A) configured according to any of the embodiments disclosed herein and may be operably assembled to a downhole drilling assembly. U.S. Pat. Nos. 4,410,054; 4,560,014; 5,364,192; 5,368,398; and 5,480,233, the disclosure of each of which is incorporated herein, in its entirety, by this reference, disclose subterranean drilling systems within which bearing apparatuses utilizing superabrasive compacts disclosed herein may be incorporated. The embodiments of PDCs disclosed herein may also form all or part of heat sinks, wire dies, bearing elements, cutting elements, cutting inserts (e.g., on a roller-cone-type drill bit), machining inserts, or any other article of manufacture as known in the art. Other examples of articles of manufacture that may use any of the PDCs disclosed herein are disclosed in U.S. Pat. Nos. 4,811,801; 4,274,900; 4,268,276; 4,468,138; 4,738,322; 4,913,247; 5,016,718; 5,092,687; 5,120,327; 5,135,061; 5,154,245; 5,180,022; 5,460,233; 5,544,713; and 6,793,681, the disclosure of each of which is incorporated herein, in its entirety, by this reference.

Figure 7:
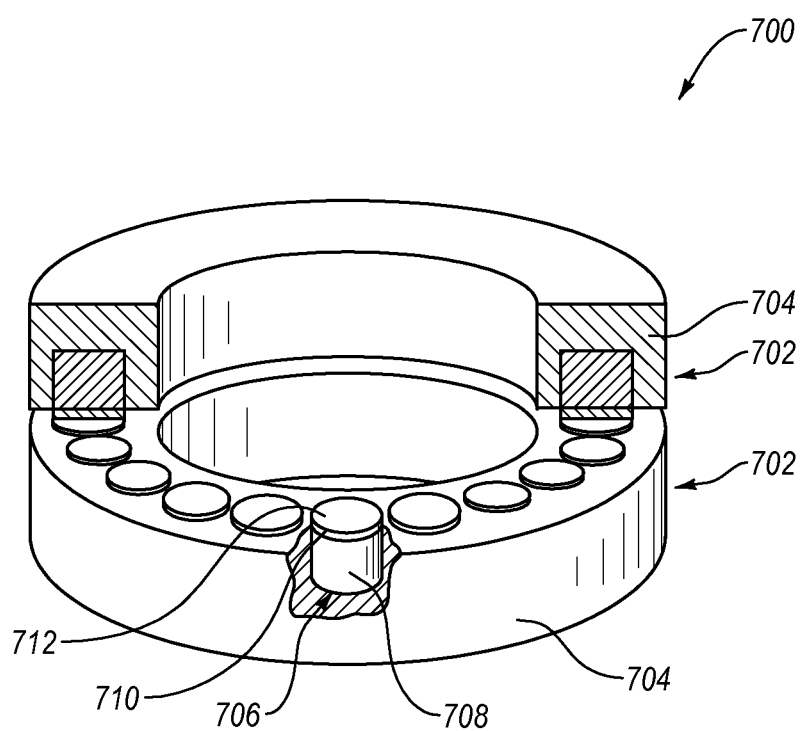
FIG. 7 is an isometric cut-away view of an embodiment of the thrust-bearing apparatus, which may utilize any of the disclosed PDC embodiments as bearing elements.
Figure 8:
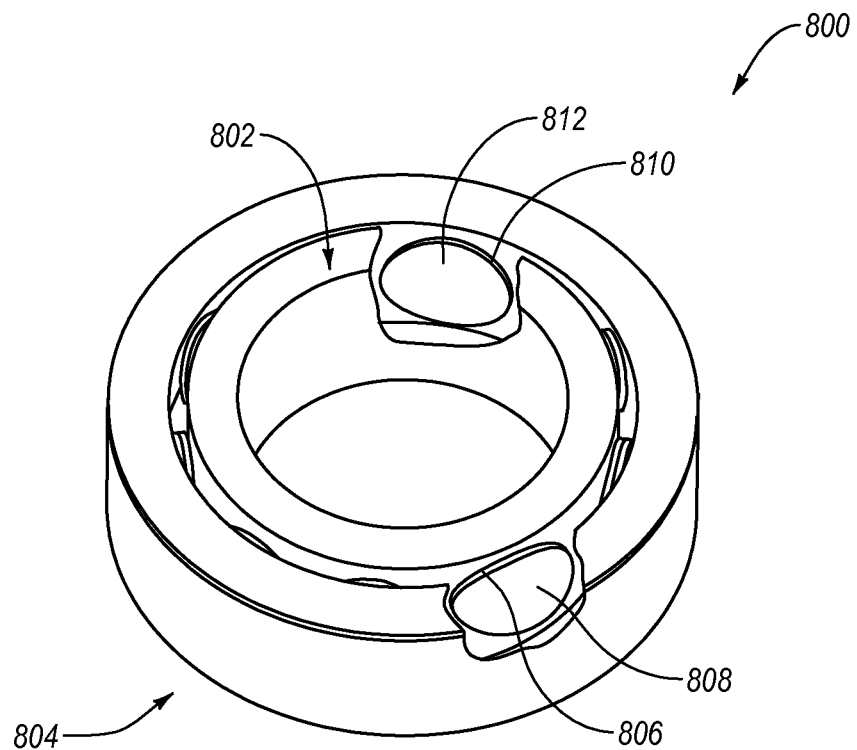
FIG. 8 is an isometric cut-away view of an embodiment of a radial bearing apparatus, which may utilize any of the disclosed PDC embodiments as bearing elements.

For example, FIGS. 7 and 8 disclose embodiments of thrust-bearing and radial bearing apparatuses, respectively. FIG. 7 is an isometric cut-away view of an embodiment of the thrust-bearing apparatus 700, which may utilize any of the disclosed PDC embodiments as bearing elements. The thrust-bearing apparatus 700 includes respective thrust-bearing assemblies 702. Each thrust-bearing assembly 702 includes an annular support ring 704 that may be fabricated from a material, such as carbon steel, stainless steel, or another suitable material. Each support ring 704 includes a plurality of recesses (not labeled) that receive a corresponding bearing element 706. Each bearing element 706 may be mounted to a corresponding support ring 704 within a corresponding recess by brazing, press-fitting, using fasteners, or another suitable mounting technique. One or more, or all of bearing elements 706 may be configured according to any of the disclosed PDC embodiments. For example, each bearing element 706 may include a substrate 708 and a PCD table 710, with the PCD table 710 including a bearing surface 712.

In use, the bearing surfaces 712 of one of the thrust-bearing assemblies 702 bear against the opposing bearing surfaces 712 of the other one of the bearing assemblies 702. For example, one of the thrust-bearing assemblies 702 may be operably coupled to a shaft to rotate therewith and may be termed a "rotor." The other one of the thrust-bearing assemblies 702 may be held stationary and may be termed a "stator."

FIG. 8 is an isometric cut-away view of an embodiment of a radial bearing apparatus 800, which may utilize any of the disclosed PDC embodiments as bearing elements. The radial bearing apparatus 800 includes an inner race 802 positioned generally within an outer race 804. The outer race 804 includes a plurality of bearing elements 806 affixed thereto that have respective bearing surfaces 808. The inner race 802 also includes a plurality of bearing elements 810 affixed thereto that have respective bearing surfaces 812. One or more, or all of the bearing elements 806 and 810 may be configured according to any of the PDC embodiments disclosed herein. The inner race 802 is positioned generally within the outer race 804, and thus the inner race 802 and outer race 804 may be configured so that the bearing surfaces 808 and 812 may at least partially contact one another and move relative to each other as the inner race 802 and outer race 804 rotate relative to each other during use.

The radial bearing apparatus 800 may be employed in a variety of mechanical applications. For example, so-called "roller-cone" rotary drill bits may benefit from a radial-bearing apparatus disclosed herein. More specifically, the inner race 802 may be mounted to a spindle of a roller cone and the outer race 804 may be mounted to an inner bore formed within a cone and such an outer race 804 and inner race 802 may be assembled to form a radial bearing apparatus.

While various aspects and embodiments have been disclosed herein, other aspects and embodiments are contemplated. The various aspects and embodiments disclosed herein are for purposes of illustration and are not intended to be limiting. Additionally, the words "including," "having," and variants thereof (e.g., "includes" and "has") as used herein, including the claims, shall be open ended and have the same meaning as the word "comprising" and variants thereof (e.g., "comprise" and "comprises").

What is claimed is:
1. A polycrystalline diamond compact, comprising:
   a substrate; and
   a pre-sintered polycrystalline diamond table bonded to the substrate, the pre-sintered polycrystalline diamond table including bonded diamond grains defining a plurality of interstitial regions, the pre-sintered polycrystalline diamond table further including:
      an upper surface;
      a back surface bonded to the substrate;
      at least one lateral surface extending between the upper surface and the back surface;
      a first region extending inwardly from the upper surface and the at least one lateral surface, the first region including at least a residual amount of at least one interstitial constituent disposed in at least a portion of the interstitial regions thereof, the at least one interstitial constituent including at least one metal carbonate and/or at least one metal oxide, wherein the at least one metal oxide includes one or more alkali metal oxides, one or more alkaline earth metal oxides, or combinations thereof; and a second bonding region adjacent to the substrate and extending inwardly from the back surface to a depth of about 50 μm to about 1000 μm, the second bonding region including a metallic infiltrant and a residual amount of the at least one interstitial constituent disposed in at least a portion of the interstitial regions thereof.

2. The polycrystalline diamond compact of claim 1 wherein the at least one interstitial constituent present in the first region comprises about 0.05 weight % to about 1.5 weight percent of the pre-sintered PCD table.

3. The polycrystalline diamond compact of claim 1 wherein the pre-sintered polycrystalline diamond table comprises a core region about which the first region at least partially extends, the first region depleted of the at least one interstitial constituent relative to the core region, the first region extending inwardly from the upper surface and the at least one lateral surface.

4. The polycrystalline diamond compact of claim 3 wherein the at least one interstitial constituent present in the core region comprises about 0.1 weight % to about 20 weight percent of the pre-sintered PCD table.

5. The polycrystalline diamond compact of claim 3 wherein the first region is not disposed between the core region and the second bonding region.

6. The polycrystalline diamond compact of claim 3 wherein the second bonding region is disposed between the substrate and a portion of the first region, and further wherein the portion of the first region is disposed between the core region and the second bonding region.

7. The polycrystalline diamond compact of claim 1 wherein the region comprises one or more leaching by-products disposed in at least a portion of the interstitial regions thereof.

8. The polycrystalline diamond compact of claim 1 wherein the at least one metal carbonate comprises one or more alkali metal carbonates, one or more alkaline earth metal carbonates, or combinations thereof.

9. The polycrystalline diamond compact of claim 1 wherein the metallic infiltrant present in the second bonding region is provided from the substrate.

10. The polycrystalline diamond compact of claim 1 wherein the metallic infiltrant comprises cobalt, iron, nickel, or alloys thereof.

11. The polycrystalline diamond compact of claim 1 wherein the metallic infiltrant present in the bonding region comprises a braze alloy.

12. The polycrystalline diamond compact of claim 1 wherein the pre-sintered polycrystalline diamond table comprises a chamfer that extends between the at least one lateral surface and the upper surface, the region extending inwardly from the chamfer to about the same depth as from the upper surface.

13. The polycrystalline diamond compact of claim 1 wherein the substrate comprises a cemented carbide substrate.

14. A rotary drill bit, comprising:
a bit body configured to engage a subterranean formation; and
a plurality of polycrystalline diamond cutting elements affixed to the bit body, at least one of the polycrystalline diamond cutting elements including:
a substrate; and
a pre-sintered polycrystalline diamond table bonded to the substrate, the pre-sintered polycrystalline diamond table including bonded diamond grains defining a plurality of interstitial regions, the pre-sintered polycrystalline diamond table further including:
an upper surface;
a back surface bonded to the substrate;
at least one lateral surface extending between the upper surface and the back surface;
a region extending inwardly from the upper surface and the at least one lateral surface, the region including at least a residual amount of at least one interstitial constituent disposed in at least a portion of the interstitial regions thereof, the at least one interstitial constituent including at least one metal carbonate and/or at least one metal oxide, wherein the at least one metal oxide includes one or more alkali metal oxides, one or more alkaline earth metal oxides, or combinations thereof; and
a bonding region adjacent to the substrate and extending inwardly from the back surface to a depth of about 50 μm to about 1000 μm, the bonding region including a metallic infiltrant and a residual amount of the at least one interstitial constituent disposed in at least a portion of the interstitial regions thereof.

15. A rotary drill bit, comprising:
a bit body configured to engage a subterranean formation; and
a plurality of polycrystalline diamond cutting elements affixed to the bit body, at least one of the polycrystalline diamond cutting elements directly bonded to the bit body without an intervening substrate therebetween, the at least one of the polycrystalline diamond cutting elements including:
bonded diamond grains defining a plurality of interstitial regions;
an upper surface;
a back surface bonded to the substrate;
at least one lateral surface extending between the upper surface and the back surface;
a region extending inwardly from the upper surface and the at least one lateral surface, the region including at least a residual amount of at least one interstitial constituent disposed in at least a portion of the interstitial regions thereof, the at least one interstitial constituent including at least one metal carbonate and/or at least one metal oxide, wherein the at least one metal oxide includes one or more alkali metal oxides, one or more alkaline earth metal oxides, or combinations thereof; and
a bonding region bonded to the bit body and extending inwardly from the back surface to a depth of about 50 μm to about 1000 μm, the bonding region including a metallic infiltrant and a residual amount of the at least one interstitial constituent disposed in at least a portion of the interstitial regions thereof.

16. The rotary drill bit of claim 15 wherein the metallic infiltrant comprises braze alloy that bonds the at least one of the polycrystalline diamond cutting elements to the bit body.

17. The rotary drill bit of claim 15 wherein the bit body comprises carbide particles infiltrated with a binder, and wherein the metallic infiltrant comprises the binder.

18. A method of manufacturing a polycrystalline diamond compact, comprising:
assembling a treated polycrystalline diamond table with a substrate;

wherein the treated polycrystalline diamond table includes an upper surface, a back surface, and at least one lateral surface extending between the upper surface and the back surface;

wherein the treated polycrystalline diamond table further includes:

a region extending inwardly from at least the back surface to a depth of about 50 μm to about 1000 μm, the region including a residual amount of at least one interstitial constituent disposed in at least a portion of the interstitial regions thereof, the at least one interstitial constituent including at least one metal carbonate and/or at least one metal oxide, wherein the at least one metal oxide includes one or more alkali metal oxides, one or more alkaline earth metal oxides, or combinations thereof;

bonding the region of the treated polycrystalline diamond table to the substrate.

19. The method of claim 18 wherein assembling a treated polycrystalline diamond table with a substrate comprises disposing a braze alloy between the pre-sintered polycrystalline diamond table and the substrate, and wherein bonding the treated polycrystalline diamond table to the substrate comprises brazing the treated polycrystalline diamond table to the substrate.

20. The method of claim 18 wherein bonding the treated polycrystalline diamond table to the substrate comprises infiltrating a metallic infiltrant into at least a portion of the region.

21. The method of claim 18 wherein bonding the treated polycrystalline diamond table to the substrate comprises a high-pressure/high-temperature process.

22. The method of claim 18 wherein the treated polycrystalline diamond table is formed by sintering diamond particles in the presence of at least one carbonate catalyst material.

23. The method of claim 18 wherein the treated polycrystalline diamond table is fabricated according to a process including sintering a plurality of diamond particles in the presence of at least one carbonate catalyst material in a high-pressure/high-emperature process to form a sintered polycrystalline diamond body, and depleting the sintered polycrystalline diamond body of the at least one interstitial constituent to form the region.

24. A polycrystalline diamond cutting element, comprising:

a plurality of directly bonded-together diamond grains defining a plurality of interstitial regions;
an upper surface;
a back surface;
at least one lateral surface extending between the upper surface and the back surface;
a region including a residual amount of at least one interstitial constituent disposed in at least a portion of the interstitial regions thereof, the at least one interstitial constituent including at least one metal carbonate and/or at least one metal oxide, the region extending inwardly from at least the back surface and the at least one lateral surface to a depth of about 50 μm to about 1000 μm;
wherein the at least one metal oxide includes one or more alkali metal oxides, one or more alkaline earth metal oxides, or combinations thereof.

25. The polycrystalline diamond cutting element of claim 24 wherein the region comprises one or more leaching by-products.

26. The polycrystalline diamond cutting element of claim 25 wherein the one or more leaching by-products comprises one or more salts.

27. The polycrystalline diamond cutting element of claim 24 wherein the region is a depletion region from which the at least one interstitial constituent is depleted relative to a core region about which the depletion region at least partially extends.

28. A method of manufacturing a rotary drill bit, comprising:

disposing a polycrystalline diamond cutting element in a corresponding cutter pocket of a bit body of the rotary drill bit;

wherein the polycrystalline diamond cutting element includes an upper surface, a back surface, and at least one lateral surface extending between the upper surface and the back surface;

wherein the pre-sintered polycrystalline diamond cutting element further includes:

a region extending inwardly from the back surface and the at least one lateral surface to a depth of about 50 μm to about 1000 μm, the region including a residual amount of at least one interstitial constituent disposed in at least a portion of the interstitial regions thereof, the at least one interstitial constituent including at least one metal carbonate and/or at least one metal oxide, wherein the at least one metal oxide includes one or more alkali metal oxides, one or more alkaline earth metal oxides, or combinations thereof;

bonding the region of the polycrystalline diamond cutting element directly to the bit body.

* * * * *

UNITED STATES PATENT AND TRADEMARK OFFICE
CERTIFICATE OF CORRECTION

PATENT NO. : 8,727,044 B2
APPLICATION NO. : 13/070636
DATED : May 20, 2014
INVENTOR(S) : Qian et al.

Page 1 of 1

It is certified that error appears in the above-identified patent and that said Letters Patent is hereby corrected as shown below:

In the Claims

In Column 19, Claim 23, Lines 40-41, delete "high-pressure/high-emperature" and insert -- high-pressure/high-temperature --, therefor.

Signed and Sealed this
Thirtieth Day of June, 2015

Michelle K. Lee
*Director of the United States Patent and Trademark Office*